United States Patent
Miguirditchian et al.

(10) Patent No.: US 10,464,819 B2
(45) Date of Patent: Nov. 5, 2019

(54) PROCESSES FOR SELECTIVE RECOVERY OF RARE EARTH METALS PRESENT IN ACIDIC AQUEOUS PHASES RESULTING FROM THE TREATMENT OF SPENT OR SCRAPPED PERMANENT MAGNETS

(71) Applicant: COMMISSARIAT A L'ENERGIE ATOMIQUE ET AUX ENERGIES ALTERNATIVES, Paris (FR)

(72) Inventors: Manuel Miguirditchian, Avignon (FR); Victor Haquin, Bagnols sur Ceze (FR); Vincent Pacary, Gaujac (FR); Richard Laucournet, La Buisse (FR); Marc Montuir, Chateauneuf-du-Pape (FR)

(73) Assignee: COMMISSARIAT A L'ENERGIE ATOMIQUE AUX ENERGIES ALTERNATIVES, Paris (FR)

( * ) Notice: Subject to any disclaimer, the term of this patent is extended or adjusted under 35 U.S.C. 154(b) by 303 days.

(21) Appl. No.: 15/511,926

(22) PCT Filed: Sep. 22, 2015

(86) PCT No.: PCT/EP2015/071679
§ 371 (c)(1),
(2) Date: Mar. 16, 2017

(87) PCT Pub. No.: WO2016/046179
PCT Pub. Date: Mar. 31, 2016

(65) Prior Publication Data
US 2017/0291827 A1    Oct. 12, 2017

(30) Foreign Application Priority Data
Sep. 24, 2014 (FR) ...................... 14 59023

(51) Int. Cl.
*C01F 17/00* (2006.01)
*C22B 60/02* (2006.01)
(Continued)

(52) U.S. Cl.
CPC ...... *C01F 17/0006* (2013.01); *C01F 17/0075* (2013.01); *C22B 3/0005* (2013.01);
(Continued)

(58) Field of Classification Search
CPC ............ C01F 17/0006; C01F 17/0075; C22B 3/0005; C22B 3/0012; C22B 7/007;
(Continued)

(56) References Cited

U.S. PATENT DOCUMENTS

| | | |
|---|---|---|
| 2011/0002823 A1 | 1/2011 | Miguirditchian et al. |
| 2013/0102806 A1 | 4/2013 | Sakaki et al. |
| 2015/0292060 A1 | 10/2015 | Laucournet et al. |

FOREIGN PATENT DOCUMENTS

| | | |
|---|---|---|
| EP | 2 592 068 A1 | 5/2013 |
| FR | 2 810 679 A1 | 12/2001 |

(Continued)

OTHER PUBLICATIONS

Mowafy, E. A. & D. Mohamed. "Extraction and separation of Nd(III), Sm(III), Dy(III), Fe(III), Ni(II), and Cs(I) from concentrated chloride solution with N,N,N',N'-tetra(2-ethylhexyl) diglycolamide as new extractant." Journal of Rare Earths, vol. 33, No. 4, pp. 432-438. April. (Year: 2015).*

(Continued)

*Primary Examiner* — Tima M. McGuthry-Banks
(74) *Attorney, Agent, or Firm* — Oblon, McClelland, Maier & Neustadt, L.L.P.

(57) ABSTRACT

The invention relates to a hydrometallurgical process which makes it possible to selectively recover at least one "heavy" rare earth metal, i.e. a rare earth metal with an atomic (Continued)

number at least equal to 62, that is in an acidic aqueous phase resulting from the treatment of spent or scrapped permanent magnets. It also relates to a hydrometallurgical process which makes it possible to selectively recover, on the one hand, at least one heavy rare earth metal present in an acidic aqueous phase resulting from the treatment of spent or scrapped permanent magnets and, on the other hand, at least one "light" rare earth metal, i.e. a rare earth metal with an atomic number at most equal to 61, that is also in this acidic aqueous phase. The invention has in particular an application in the recycling of rare earth metals present in spent or scrapped permanent magnets of the type Neodymium-Iron-Boron (or NdFeB) and, in particular, dysprosium, praseodymium and neodymium, and also in the recycling of samarium present in spent or scrapped permanent magnets of the type samarium-cobalt (or SmCo).

29 Claims, 8 Drawing Sheets

(51) Int. Cl.
C22B 7/00 (2006.01)
C22B 59/00 (2006.01)
C22B 3/26 (2006.01)
C22B 3/28 (2006.01)

(52) U.S. Cl.
CPC ............ *C22B 3/0012* (2013.01); *C22B 7/007* (2013.01); *C22B 59/00* (2013.01); *C22B 60/026* (2013.01); *C22B 60/0226* (2013.01); *C22B 60/0239* (2013.01); *C01P 2006/80* (2013.01); *Y02P 10/234* (2015.11)

(58) Field of Classification Search
CPC . C22B 59/00; C22B 60/0226; C22B 60/0239; C22B 60/026; Y02P 10/234
See application file for complete search history.

(56) References Cited

FOREIGN PATENT DOCUMENTS

| FR | 2 907 346 A1 | 4/2008 |
| FR | 2 997 095 A1 | 4/2014 |
| WO | 2014/064597 A2 | 5/2014 |

OTHER PUBLICATIONS

Ansari, Seraj. A. & Priyananth Pathak, Prasanta K. Mohapatra, Vijay K. Manchanda. "Chemistry of Diglycolamides; Promising Extractants for Actinide Partitioning." Chemical Reviews. vol. 112. pp. 1751-1775. (Year: 2012).*

Kim, Daejin & Lawrence E. Powell, Laetitia H. Delmau, Eric S. Peterson, Jim Herchenroeder, Ramesh R. Bhave. "Selective Extraction of Rare Earth Elements from Permanent Magnet Scraps with Membrane Solvent Extraction." Environmental Science & Technology. vol. 49, pp. 9452-9459. (Year: 2015).*

International Search Report dated Jan. 5, 2016 in PCT/EP2015/071679 filed Sep. 22, 2015.

French Search Report dated May 27, 2015 in FR 1459023 filed Sep. 24, 2014.

Narita, Hirokazu et al., "Separation of Rare Earth Elements from Base Metals in Concentrated $HNO_3$ $H_2SO_4$ and HCl Solutions with Diglycolamide," Solvent Extraction Research and Development, Japan, Mar. 2, 2013, vol. 20, pp. 115-121, XP055190781.

* cited by examiner

PROCESSES FOR SELECTIVE RECOVERY OF RARE EARTH METALS PRESENT IN ACIDIC AQUEOUS PHASES RESULTING FROM THE TREATMENT OF SPENT OR SCRAPPED PERMANENT MAGNETS

TECHNICAL FIELD

The invention relates to the field for recovering rare earth metals present in spent or scrapped permanent magnets with view to recycling these rare earth metals.

More specifically, the invention relates to a hydrometallurgical method giving the possibility of selectively recovering at least one "heavy" rare earth metal, i.e. with an atomic number at least equal to 62 (samarium, europium, gadolinium, terbium, dysprosium, holmium, erbium, thulium and/or ytterbium), found in an acid aqueous phase stemming from the processing of spent or scrapped permanent magnets.

It also relates to a hydrometallurgical method giving the possibility of selectively recovering not only at least one heavy rare earth metal present in an acid aqueous phase stemming from the processing of spent or scrapped permanent magnets, but also at least one "light" rare earth metal, i.e. with an atomic number at most equal to 61 (scandium, yttrium, lanthanum, cerium, praseodymium and/or neodymium), also found in this acid aqueous phase.

The invention finds a particularly interesting application in the recycling of rare earth metals contained in permanent magnets of the Neodymium-Iron-Boron (or NdFeB) either spent or scrapped, and in particular with dysprosium (which is the heavy rare earth metal present in this type of magnets which is the most interesting economically), with praseodymium and neodymium (which are the most abundant rare earth metals in this type of magnets), as well as in the recycling of samarium contained in permanent magnets of the spent or scrapped samarium-cobalt type (or SmCo).

STATE OF THE PRIOR ART

The particular physical and chemical of rare earth metals (scandium, yttrium and lanthanides) presently make chemical elements thereof indispensable in many industrial fields: industries of glass and of ceramics, catalysis, metallurgy, manufacturing of permanent magnets, of optical devices, of luminophores, etc.

This specificity, combined with a growth in the worldwide demand for rare earth metals as well as with a limited number of countries producing rare earth metals, generate supply risks of these metals for the markets.

The diversification in the production of rare earth metals is presently the subject of strong attention on behalf of the relevant actors. The recycling of rare earth metals present in spent or scrapped materials is increasingly preferred. Up to 2011, less than 1% of these rare earth metals were recycled. The recycling gives the possibility of reconciling decrease in the supply risks and environmental challenges related to the mining activities.

One of the first markets in volume and in market value for recycling rare earth metals relates to the permanent magnets of the NdFeB type. This resource for the recycling of rare earth metals has the advantage of comprising interesting and upgradable rare earth metal proportions. Indeed, the mass contents of rare earth metals of these magnets are of the order of 30% for about 70% of iron. The composition of the NdFeB magnets varies according to the applications and the manufacturers but they typically contain heavy rare earth metals (dysprosium and to a lesser extent, gadolinium, terbium) which are highly upgradable as well as light rare earth metals (praseodymium and neodymium notably). In addition to containing iron and boron, NdFeB magnets are generally covered with an anticorrosion protective shell based on nickel and copper and on other transition metals (cobalt, chromium, etc.).

The problem is therefore to manage to recover from permanent magnets containing a significant proportion of iron, boron and diverse impurities (cobalt, nickel, copper, titanium, manganese, chromium, etc.) in weight amounts, of rare earth metals such as dysprosium, praseodymium and neodymium, with sufficient final purities for allowing the recycling of these rare earth metals (whether this is in the form of magnets or in other applications) and ideally greater than 99.5%.

The hydrometallurgical route, based on the liquid-liquid extraction technique is commonly considered as one of the most commercially suitable routes for recovering rare earth metals from the medium in which they are found and especially separate them from each other.

The hydrometallurgical methods, which are presently used industrially for recovering rare earth metals from an acid aqueous phase, preferentially use organo-phosphate extractants like phosphoric acids, phosphonic acids, phosphinic acids, carboxylic acids and alkyl phosphates. This is for example di-2-ethylhexylphosphoric acid (or HDEHP), 2-ethylhexyl-2-ethylhexylphosphonic acid (or HEH[EHP]), bis(trimethyl-2,4,4-pentyl)phosphinic acid (or Cyanex 272), neodecanoic acid (or Versatic 10) and tri-n-butylphosphate (or TBP).

However, the use of these extractants is not adapted to the recovery of the rare earth metals present in an acid aqueous phase stemming from the processing of permanent magnets NdFeB since they all have the drawback of strongly extracting the iron as well as the other transition metals. Their use would therefore require removal of the transition metals from the aqueous phase before extracting therefrom the rare earth metals, which would lead to a wieldy method to be applied and therefore not very interesting industrially.

Diglycolamides represent a family of extractants which was developed by a Japanese team within the scope of studies on the processing of used nuclear fuels with the purpose of co-extracting the trivalent actinides and the lanthanides from a raffinate of the PUREX method.

Studies on the extraction of many elements of the Mendeleev periodic classification have also been published, but the use of diglycolamides as extractants remains closely related to the processing of used nuclear fuels and in particular to the recovery of the trivalent actinides (americium and curium) present in these fuels.

The use of a diglycolamide, in this case N,N'-dimethyl-N,N'-di-n-octyldiglycolamide (or MODGA), as an extractant for recovering rare earth metals from acid aqueous solutions stemming from scrapped permanent magnets NdFeB has nevertheless been contemplated very recently in an article published by Narita and Tanaka (*Solvent Extraction Research and Development*, Japan, 2013, 20, 115-121, reference [1]).

This article shows that it is possible to separate neodymium and dysprosium from iron and from nickel as well as dysprosium from neodymium in a nitric or sulfuric medium by means of an organic phase comprising MODGA. However, the studies on which it is based exclusively rely on synthetic aqueous solutions which contain only 0.001 mol/L of dysprosium, of neodymium, of iron and of nickel, i.e. concentrations very far from those expected in an aqueous solution stemming from the processing of spent or scrapped permanent magnets. Thus, no test was carried out on aqueous solutions really obtained from permanent magnets and, therefore, able to contain up to 600 times more iron or 60 times more neodymium for example than the synthetic aqueous solutions which they used.

Moreover, this article does not specify the behavior and the impact of the other metal elements which may also be found in an acid aqueous solution stemming from the processing of permanent magnets NdFeB such as praseodymium, boron, cobalt and copper.

Finally, no scheme of a method which would allow recovery, at an industrial scale, of dysprosium and, optionally, of praseodymium and of neodynium both quantitatively and selectively is proposed in this article which is exclusively based on experiments in test tubes.

Considering the foregoing, the Inventors therefore set as a goal of providing a method which allows recovery of one or more rare earth metals present in an acid aqueous phase stemming from the processing of permanent magnets either spent or scrapped, and, in particular, of permanent magnets NdFeB and this, in a selective way towards the non-rare earth metal elements which may also be present in this aqueous phase so that the thereby recovered rare earth metal(s) thereby recovered may exhibit, together or separately, a high degree of purity, ideally greater than 99.5%.

They also set the goal that this method should allow recovery of this or these rare earth metals with a high recovery yield, ideally greater than 99.5%. They also set the goal that this method should be applicable to aqueous phases stemming from the processing of permanent magnets, for which the acidity may be included in a wide range.

Additionally they set the goal that this method should be sufficiently simple to apply so that its use at an industrial scale may reasonably be contemplated.

DISCUSSION OF THE INVENTION

These objects and further other ones are attained by the invention which first of all proposes a method (designated hereafter as "first method") for selectively recovering at least one rare earth metal TR1, with an atomic number at least equal to 62, from an acid aqueous phase A1 stemming from the processing of spent or scrapped permanent magnets and comprising one or more rare earth metal(s) TR1, transition metals and a strong acid concentration ranging from 0.2 mol/L to 6 mol/L, which method comprises:

a) extracting the rare earth metal(s) TR1 from the aqueous phase A1, by putting the aqueous phase A1 in contact with an organic phase not miscible with water, which comprises a lipophilic diglycolamide, i.e. having a total number of carbon atoms at least equal to 24, as an extractant, in an organic diluent, and then separating the aqueous and organic phases;

b) washing the organic phase obtained at the end of step a), by putting the organic phase in contact with an acid aqueous phase A2, which comprises a strong acid identical with the strong acid of the aqueous phase A1, at a concentration at most equal to the strong acid concentration of the aqueous phase A1, and then separating the aqueous and organic phases; and c) stripping the rare earth metal(s) TR1 from the organic phase obtained at the end of step b), by putting the organic phase in contact with an acid aqueous phase A3 which has a pH at least equal to 3, and then separating the aqueous and organic phases.

In the foregoing and in the following, by "spent" permanent magnets are meant all the permanent magnets which may be recovered from post-consumption industrial or domestic wastes, and notably from wastes of electric and electronic equipment (further called "DEEE" or "D3E") such as computer hard discs, electric motors, magnetic devices (scanners, loudspeakers of television sets, . . . ), etc., while by "scrapped" permanent magnets, are meant all the scraps from the manufacturing of permanent magnets and this, whether these are powders, shavings or more massive elements.

Moreover, in the foregoing and in the following, the expressions "from . . . to . . . " and "between . . . and . . . " are equivalent when they are applied to ranges, such as ranges of concentrations or of pH, and mean that these limits of these ranges are included in said ranges.

Also, the terms of "solution" and "phase" are equivalent and perfectly interchangeable.

According to the invention, the diglycolamide is advantageously selected from among diglycolamides which fit the formula (I) hereafter:

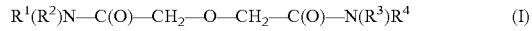

$$R^1(R^2)N-C(O)-CH_2-O-CH_2-C(O)-N(R^3)R^4 \quad (I)$$

wherein $R^1$, $R^2$, $R^3$ and $R^4$ represent, independently of each other, linear or branched alkyl groups each comprising at least 5 carbon atoms and preferably at least 8 carbon atoms such as n-octyl, 2-ethylhexyl, n-nonyl, n-decyl, n-undecyl, n-dodecyl, n-tridecyl, n-tetradecyl groups, etc.

From among these diglycolamides, the diglycolamides of formula (I) hereinbefore are most particularly preferred, in which $R^1$, $R^2$, $R^3$ and $R^4$ represent alkyl groups identical with each other and comprising from 8 to 12 carbon atoms.

As examples of such diglycolamides, mention may be made of N,N,N'N'-tetraoctyl-3-oxapentanediamide (or TODGA), N,N,N',N'-tetra(2-ethylhexyl)-3-oxapentanediamide (or TEHDGA), N,N,N',N'-tetradecyl-3-oxapentanediamide (or TDDGA) or further N,N,N'N'-tetradodecyl-3-oxapentanediamide (or TdDDGA).

According to a particularly preferred arrangement of the invention, the diglycolamide is selected from TODGA, TEHDGA and TdDDGA and better still from among TODGA and TdDDGA.

Whatever the case, the diglycolamide is present in the organic phase at a concentration typically ranging from 0.05 mol/L to 1 mol/L and preferably from 0.05 mol/L to 0.4 mol/L, this concentration being 0.2 mol/L for example.

The organic phase may further comprise a phase modifier able to increase its load capacity, i.e. the maximum concentration of metal elements which this phase may exhibit without the occurrence of the formation of a third phase by de-mixing when it is put into contact with an aqueous phase loaded with metal elements. Such a load modifier will generally be indicated in the case of an organic phase comprising a diglycolamide of formula (I) hereinbefore wherein $R^1$ to $R^4$ represent alkyl groups having less than 12 carbon atoms such as TODGA or TEHDGA.

This phase modifier may notably be selected from among trialkyl-phosphates such as tri-n-butylphosphate (or TBP) or tri-n-hexylphosphate (or THP), alcohols such as n-octanol, n-decanol or isodecanol, and monoamides such as N,N-dihexyloctanamide (or DHOA), N,N-dibutyldecanamide (or DBDA), N,N-di(2-ethylhexyl)acetamide (or D2EHAA), N,N-di(2-ethylhexyl)propionamide (or D2EHPA), N,N-di(2-ethylhexyl)isobutylamide (or D2EHiBA) or N,N-dihexyldecanamide (or DHDA).

Moreover, this phase modifier preferably does not represent more than 15% by volume of the volume of the organic phase, or even not more than 10% by volume of the volume of this phase when this is an alcohol like n-octanol.

As for the organic diluent, this may be any non-polar aliphatic organic diluent the use of which has been proposed for producing liquid-liquid extractions like a linear or branched dodecane, such as n-dodecane or hydrogenated tetrapropylene (or TPH), or a kerosene such as the one marketed by TOTAL under the trade reference Isane IP-185.

As indicated earlier, the aqueous phase A2 has a strong acid concentration at most equal to the strong acid concentration of the aqueous phase A1, which means that it may be less than or equal to this concentration. However, for reasons of washing efficiency, an aqueous phase A2 is preferably used for which the strong acid concentration is less than that of the aqueous phase A1. This concentration is typically located between 0.01 mol/L and 0.5 mol/L depending on the acidity of the aqueous phase A1 and the ratio of volumes or of flow rates O/A (organic/aqueous) used in step b). It is preferably equal to 0.01 mol/L of strong acid.

According to the invention, the strong acid present in the aqueous phase A1 and therefore in the aqueous phase A2 (since, as mentioned earlier, the latter comprises the same strong acid as the aqueous phase A1) is preferably nitric acid. However, it is obvious that it may quite act as sulfuric acid, hydrochloric acid or phosphoric acid, or even as a mixture of several strong acids as aforementioned.

The aqueous phase A3 typically has a pH comprised between 3 and 4 and preferably equal to 3. This aqueous phase may comprise as an acid a strong acid which furthermore is the same strong acid as the one present in the aqueous phases A1 and A2, for example nitric acid, in which case it typically comprises from 0.0001 mol/L to 0.001 mol/L and, preferably 0.001 mol/L of this strong acid. However, it is also possible that the aqueous phase A3 comprises as an acid, a weak acid, for example a mono-, di- or tricarboxylic acid such as glycolic acid, malonic acid or mesoxalic acid.

To promote the stripping of the rare earth metal(s) TR1 from the organic phase stemming from step b), step c) is preferably carried out under hot conditions, i.e. typically at a temperature ranging from 40° C. to 55° C. Additionally or alternatively, the aqueous phase A3 may further comprise one or several compounds complexing the rare earth metals in an aqueous phase, which compound(s) may notably be selected from among hydrophilic diglycolamides, i.e. for which the total number of carbon atoms does not exceed 20, such as N,N,N',N'-tetramethyldiglycolamide (or TMDGA), N,N,N',N'-tetraethyl-diglycolamide (or TEDGA) or N,N,N', N'-tetrapropyldiglycolamide (or TPDGA), polyaminocarboxylic acids like N-(2-hydroxyethyl)ethylene diamine triacetic acid (or HEDTA), nitrilotriacetic acid (or NTA) or diethylene triamine pentaacetic acid (or DTPA), or further from among mono-, di- or tricarboxylic acids like glycolic acid, malonic acid or mesoxalic acid in the case, of course, wherein said aqueous phase A3 does not already comprise as an acid such as mono-, di- or tricarboxylic acid.

Advantageously, the first method further comprises a step for purifying the organic phase stemming from step c), which purification may comprise, as well known per se, a washing of this organic phase with one or more acid, alkaline and/or complexing aqueous phases, capable of stripping the impurities and the possible degradation products (notably the hydrolysis products) which it contains without however stripping the diglycolamide. In which case, this method is applied as a cycle formed by steps a), b), c) and the purification of the organic phase stemming from step c).

According to the invention, the first method, as it has just been described, is preferably applied for recovering dysprosium (Z=66) contained in spent or scrapped permanent magnets NdFeB, in which case the aqueous phase A1 stems from the processing of permanent magnets of this type and comprises dysprosium as a rare earth metal TR1.

However, this method may also be applied for selectively recovering samarium (Z=62) contained in spent or scrapped permanent magnets SmCo, in which case the aqueous phase A1 stems from the processing of permanent magnets of this type and comprises samarium as a rare earth metal TR1.

Further it may be applied in a more complex method giving the possibility of selectively recovering, not only one or more heavy rare earth metals contained in spent or scrapped permanent magnets, but also one or more light rare earth metals contained in these magnets and therefore which may be integrated into this method.

Accordingly, the invention also has the goal of a method (designated hereafter as "second method") for selectively recovering at least one rare earth metal TR1 with an atomic number at least equal to 62, and of at least one rare earth metal TR2 with an atomic number at most equal to 61, from an acid aqueous phase A1 stemming from the processing of spent or scrapped permanent magnets and comprising one or more rare earth metal(s) TR1 and one or more rare earth metal(s) TR2, transition metals and a strong acid concentration ranging from 0.2 mol/L to 6 mol/L.

In a first embodiment of this second method, the latter comprises, on the one hand, the selective recovery of the rare earth metal(s) TR1 from the aqueous phase A1 by applying steps a), b) and c) described earlier, and, on the other hand, the selective recovery of the rare earth metal(s) TR2 from the aqueous phase obtained at the end of step a) by applying three additional steps, respectively d), e) and f) hereafter.

In other words, in this first embodiment, the second method comprises:

recovery of the rare earth metal(s) TR1 present in the aqueous phase A1, which recovery comprises the following steps:

a) extracting the rare earth metal(s) TR1 from the aqueous phase A1, by putting the aqueous phase A1 in contact with a first organic phase not miscible with water, which comprises a diglycolamide having a total number of carbon atoms at least equal to 24 as an extractant, in an organic diluent, and then separating the aqueous and organic phases;

b) washing the organic phase obtained at the end of step a), by putting the organic phase in contact with an acid aqueous phase A2, which comprises a strong acid identical with the strong acid of the aqueous phase A1, at a concentration at most equal to the strong acid concentration of the aqueous phase A1, and then separating the aqueous and organic phases; and c) stripping the rare earth metal(s) TR1 from the organic phase obtained at the end of step b), by putting the organic phase in contact with an acid aqueous phase A3 which has a pH at least equal to 3, and then separating the aqueous and organic phases; and recovery of the rare earth metal(s) TR2 present in the aqueous phase obtained at the end of step a), which recovery comprises the following steps:

d) extracting the rare earth metal(s) TR2 from the aqueous phase obtained at the end of step a), by putting the aqueous phase in contact with a second organic phase, non-miscible with water, which comprises the same extractant as the first organic phase, in an organic diluent, and then separating the aqueous and organic phases;

e) washing the organic phase obtained at the end of step d), by putting the organic phase into contact with an acid aqueous phase A4, which comprises a strong acid identical with the strong acid of the aqueous phase A1, at a concentration at most equal to the strong acid concentration of the aqueous phase stemming from step a), and then separating the aqueous and organic phases; and f) stripping the rare earth metal(s) TR2 from the organic phase obtained at the end of step e), by putting the organic phase into contact with an acid aqueous phase A5 which has a pH at least equal to 3, and then separating the aqueous and organic phases.

In this first embodiment, the preferred characteristics of diglycolamide, of the first organic phase and of the aqueous phases A2 and A3 are as described earlier for the first method.

Moreover, all what has been mentioned earlier as regards the organic phase of the first method also applies to the second organic phase.

As indicated earlier, the aqueous phase A4 has a strong acid concentration at most equal to the strong acid concentration of the aqueous phase A1, which means that it may be less than or equal to this concentration. However, for efficiency reasons of the washing, an aqueous phase A4 is preferably used, the strong acid concentration of which is less than that of the aqueous phase A1. This concentration is typically located between 0.2 mol/L and 4 mol/L depending on the acidity of the aqueous phase stemming from step a) and from the ratio of volumes or flow rates O/A used in step e). It preferably is equal to 1 mol/L of strong acid.

The aqueous phase A5 typically has a pH comprised between 3 and 4 and preferably, equal to 3. This aqueous phase may comprise as an acid a strong acid which furthermore is the same strong acid as the one present in the aqueous phases A1, A2 and A4, for example nitric acid, in which case it typically comprises from 0.0001 mol/L to 0.001 mol/L and, preferably 0.001 mol/L of this strong acid. However, it is also possible that the aqueous phase A5 comprises as an acid, a weak acid of the type of the aforementioned ones.

There also, the stripping of the rare earth metal(s) TR2 from the organic phase stemming from step e) may be promoted by achieving step f) under hot conditions, i.e. typically at a temperature ranging from 40° C. to 55° C., and/or by adding to the aqueous phase A5 one or more compounds complexing the rare earth metals in an aqueous medium of the type of the aforementioned ones.

In this first embodiment, the method advantageously comprises further a purification of the organic phases stemming from steps c) and f). In which case, the method is preferably applied as a first and a second cycle, the first cycle being formed by steps a), b), c) and the purification of the organic phase stemming from step c) and the second cycle being formed by steps d), e), f) and the purification of the organic phase stemming from step f).

Still further, it is preferred that the method be applied in the form of a first and a second cycle using the same organic phase, in which case the first cycle comprises steps a), b) and c), the second cycle comprises steps d), e) and f), the first and second cycles having in common the fact of comprising a purification of an organic phase formed by the gathering of the organic phases stemming from steps c) and f) and then division of the thereby purified organic phase into said first and second organic phases.

In a second embodiment of the second method, the latter comprises steps a), b) and c) described earlier but, further to the fact that step a) aims at extracting the rare earth metal(s) TR2 in addition to the rare earth metal(s) TR1, the method comprises, between steps b) and c), two additional steps, respectively b') and b") hereafter, which aim:

for the first, at stripping the rare earth metal(s) TR2 from the organic phase obtained at the end of step b) by means of an acid aqueous phase; and for the second, at washing the acid aqueous phase obtained at the end of this stripping for withdrawing the rare earth metal(s) TR1 therefrom which may have been stripped together with the rare earth metal(s) TR2;

whereby, in step c), the rare earth metal(s) TR1 is (are) stripped from the organic phase obtained at the end of step b') and not from the one obtained in step b).

In other words, in this second embodiment, the second method comprises:

a) extracting the rare earth metal(s) TR1 and the rare earth metal(s) TR2 from the aqueous phase A1, by putting the aqueous phase A1 in contact with a first organic phase not miscible with water, which comprises a diglycolamide having a total number of carbon atoms at least equal to 24 as an extractant, in an organic diluent and then separating the aqueous and organic phases;

b) washing the organic phase obtained at the end of step a), by putting into contact the organic phase with an acid aqueous phase A2, which comprises a strong acid identical with the strong acid of the aqueous phase A1, at a concentration at most equal to the strong acid concentration of the aqueous phase A1, and then separating the aqueous and organic phases;

b') stripping the rare earth metal(s) TR2 from the organic phase obtained at the end of step b), by putting the organic phase into contact with an acid aqueous phase A5 which has a pH ranging from 1 to 2.3, and then separating the organic and aqueous phases;

b") washing the aqueous phase obtained at the end of step b'), by putting the aqueous phase into contact with a second organic phase not miscible with water, which comprises the same extractant as the first organic phase, in an organic diluent, and then separating the aqueous and organic phases; and c) stripping the rare earth metal(s) TR1 from the organic phase obtained at the end of step b'), by putting the organic phase into contact with an acid aqueous phase A3 which has a pH at least equal to 3, and then separating of the aqueous and organic phases.

In this second embodiment, the preferred characteristics of the diglycolamide, of the first organic phase and of the aqueous phase A3 are, there again, as described earlier for the first method.

Moreover, all what has been mentioned earlier as regards the organic phase of the first method also applies to the second organic phase.

On the other hand, the aqueous phase A2 has a strong acid concentration typically located between 0.2 mol/L and 4 mol/L depending on the acidity of the aqueous phase A1 and on the ratio of volumes or flow rates O/A used in step b). This concentration is preferably equal to 1 mol/L of strong acid.

The aqueous phase A5 advantageously has a pH equal to 2. As earlier, this aqueous phase may comprise as an acid a strong acid, which furthermore is the same strong acid as the one present in the aqueous phases A1 and A2, for example nitric acid, in which case it comprises from 0.005 mol/L to 0.1 mol/L and preferably 0.01 mol/L of this strong acid. There also, the aqueous phase A5 may comprise a weak acid instead and in place of a strong acid.

As earlier, the aqueous phase A5 may also comprise one or more compounds complexing the rare earth metals in an aqueous medium of the type of the aforementioned ones. On the other hand, step b') is preferably achieved at room temperature for avoiding occurrence of a too large stripping of the rare earth metal(s) TR1 together with the stripping of the rare earth metal(s) TR2.

In this second embodiment, the method advantageously comprises further a purification of the organic phase stemming from step c). In which case, the method is preferably applied in the form of a cycle formed by steps a), b), b'), b"), c) and the purification of the organic phase stemming from step c).

Regardless of the embodiment of the second method, the strong acid is also preferably nitric acid, it being understood that it may quite be another strong acid like sulfuric acid, hydrochloric acid or phosphoric acid, or even of a mixture of several strong acids such as the aforementioned ones.

Moreover, regardless of the embodiment of the second method, the latter is preferably utilized for selectively recovering dysprosium, praseodymium ($Z=59$) and neodymium ($Z=60$) contained in spent or scrapped permanent magnets NdFeB, in which case the aqueous phase A1 stems from the processing of permanent magnets of this type and comprises dysprosium as a rare earth metal TR1 and praseodymium and neodymium as rare earth metals TR2.

Whether the magnets are permanent magnets NdFeB or permanent magnets of another type, the aqueous phase A1 may notably stem from the dissolution of a powder of permanent magnets in a strong acid supplemented with an oxidizing agent such as hydrogen peroxide, as described in international application PCT WO 2014/064587, hereafter referenced [2], the powder of permanent magnets itself being obtained by demagnetization and milling of permanent magnets and then processing with hydridation-dehydridation of the thereby obtained milled material, as also described in said reference [2].

Other characteristics and advantages of the invention will become apparent from the additional description which follows.

It is obvious that this additional description is only given as an illustration of the object of the invention and should by no means be interpreted as a limitation of this object.

SHORT DESCRIPTION OF THE FIGURES

Figure 4A:
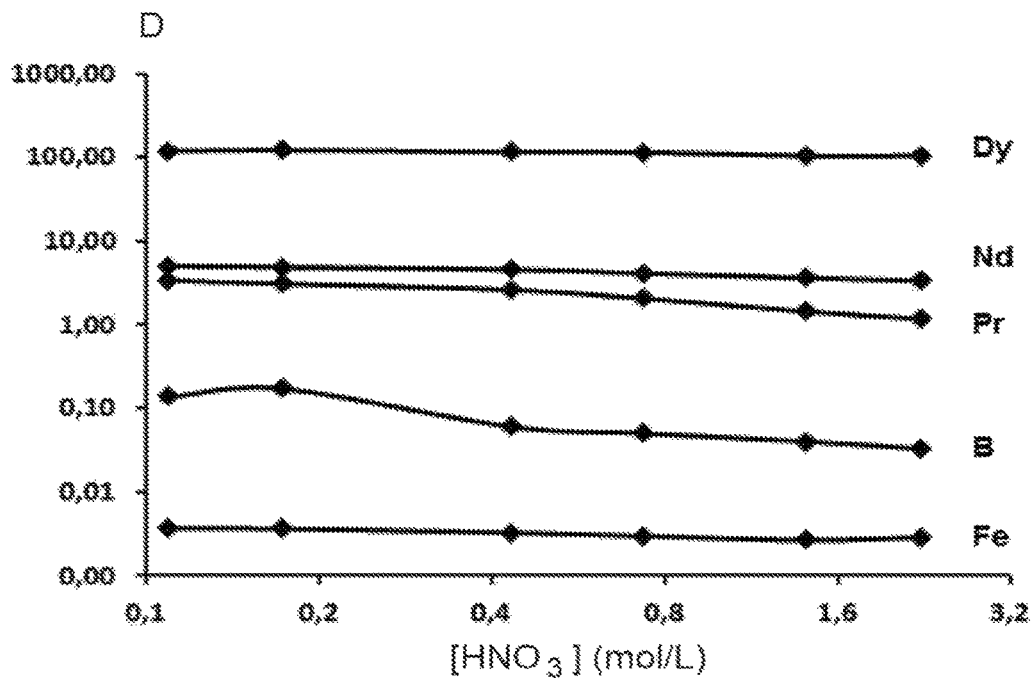
Figure 4B:
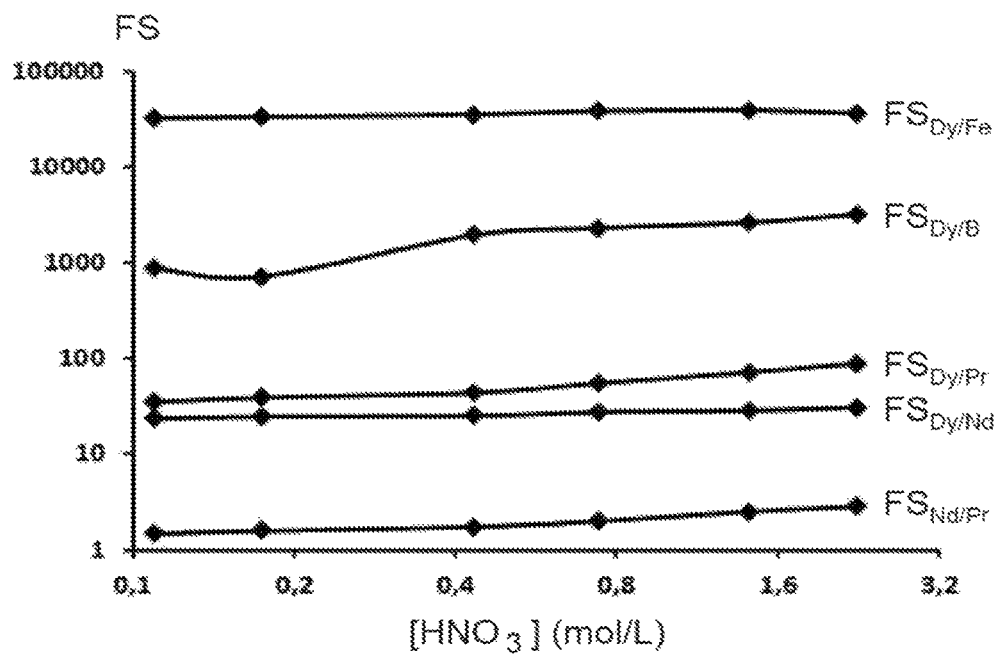

FIGS. 4A and 4B illustrate results of extraction tests carried out on synthetic nitric aqueous phases, comprising boron, iron, dysprosium, praseodymium and neodymium, and by using organic phases comprising 0.2 mol/L of TODGA, 5% (v/v) of n-octanol in n-dodecane; FIG. 4A shows the distribution coefficients, noted as $D_M$, of the different metal elements obtained according to the nitric acid concentration, expressed in mol/L, of the tested aqueous phases while FIG. 4B shows the separation factors, respectively noted as $FS_{Dy/Nd}$, $FS_{Dy/Pr}$, $FS_{Dy/B}$ and $FS_{Dy/Fe}$, between dysprosium and the other metal elements as well as the separation factor noted as $FS_{Nd/Pr}$, between neodymium and praseodymium, obtained according to the nitric acid concentration, expressed in mol/L, of the tested aqueous phases.

Figure 1:
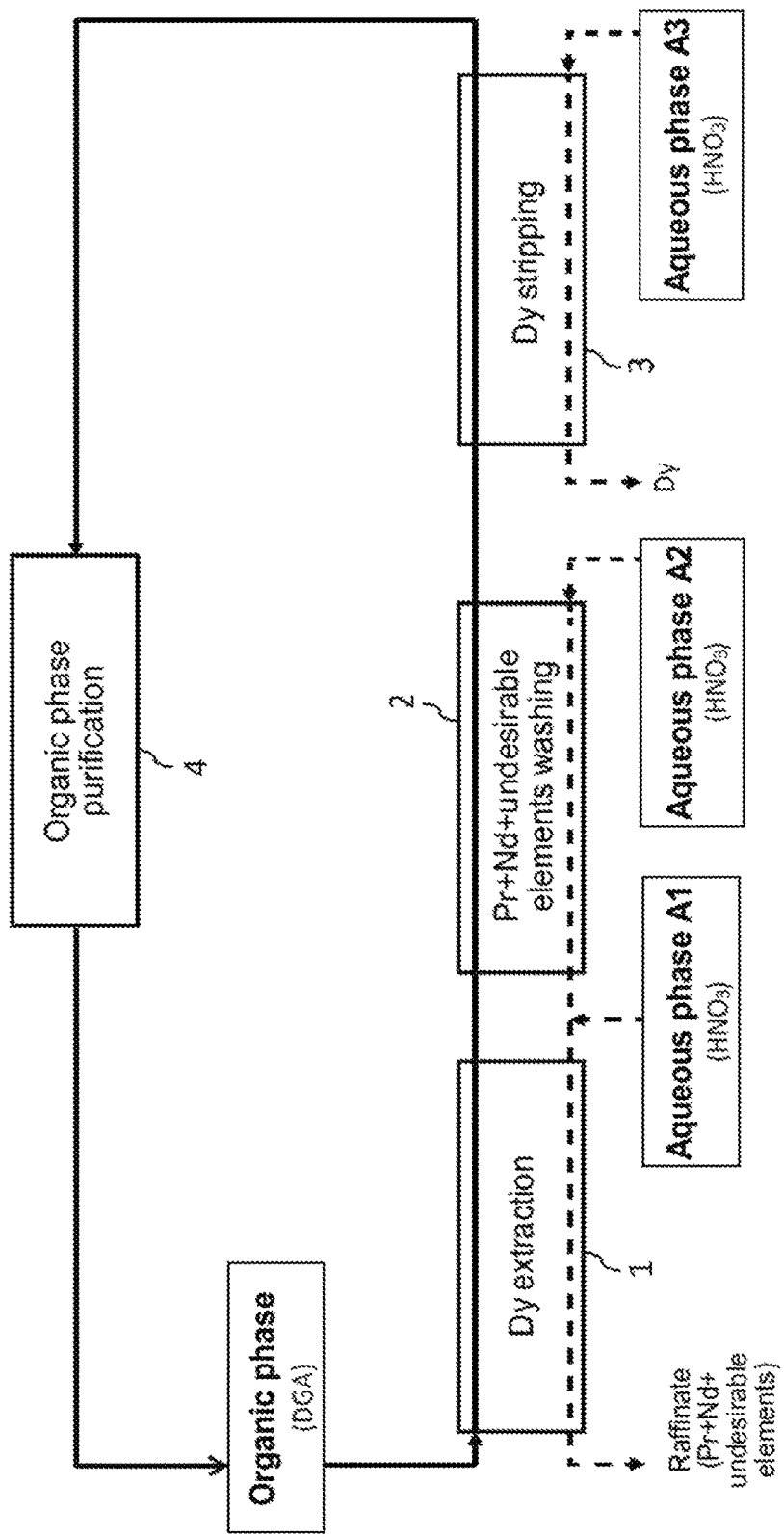
FIG. 1 illustrates the principle of a preferred embodiment of the first method of the invention, applied to the processing, at an industrial scale, of a nitric aqueous phase stemming from the processing of spent or scrapped permanent magnets NdFeB, with view to selectively recovering dysprosium present in this aqueous phase.
Figure 5:
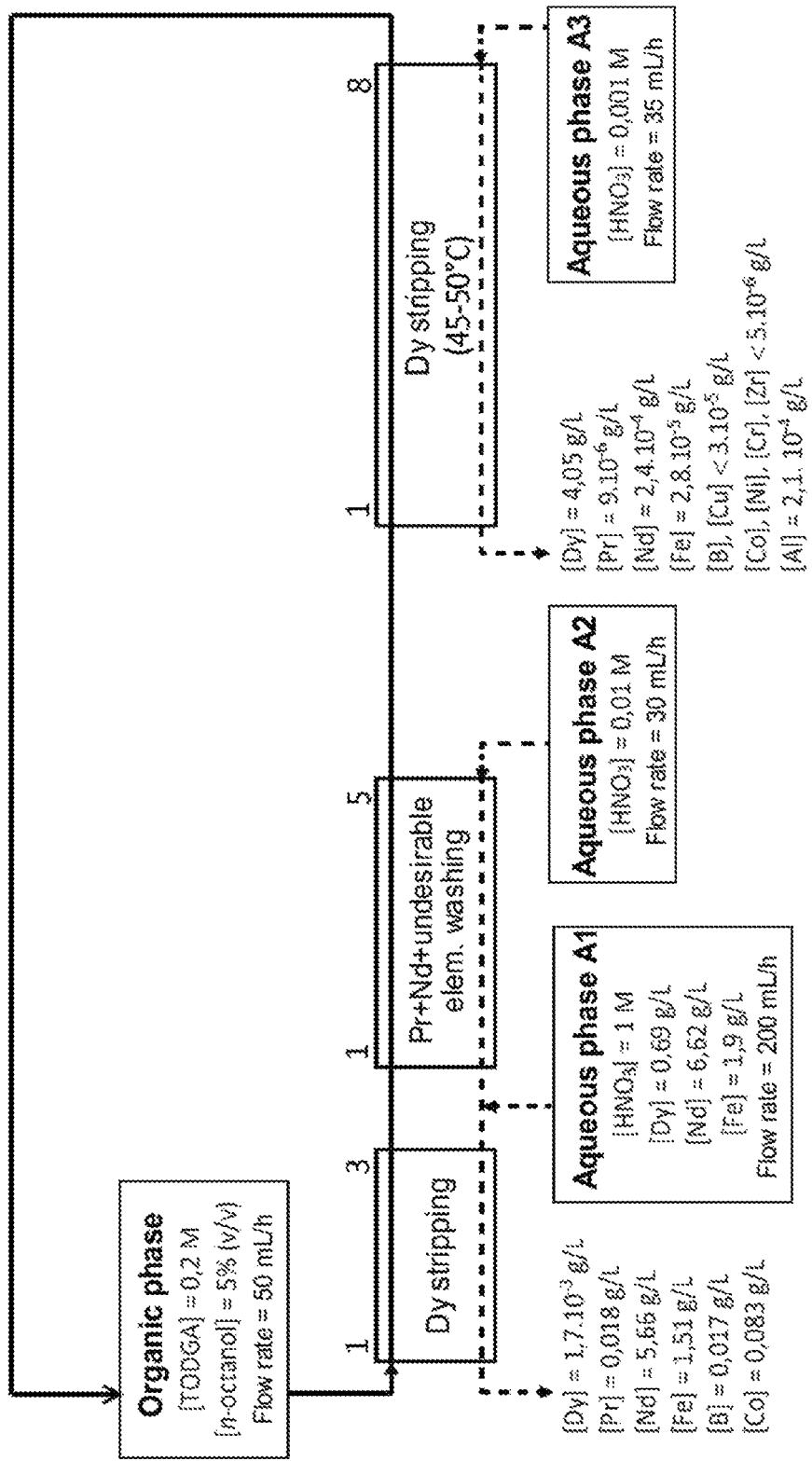

FIG. 5 illustrates the scheme which was used for testing, in mixers-decanters, the preferred embodiment of the first method of the invention illustrated in FIG. 1.

Figure 3:
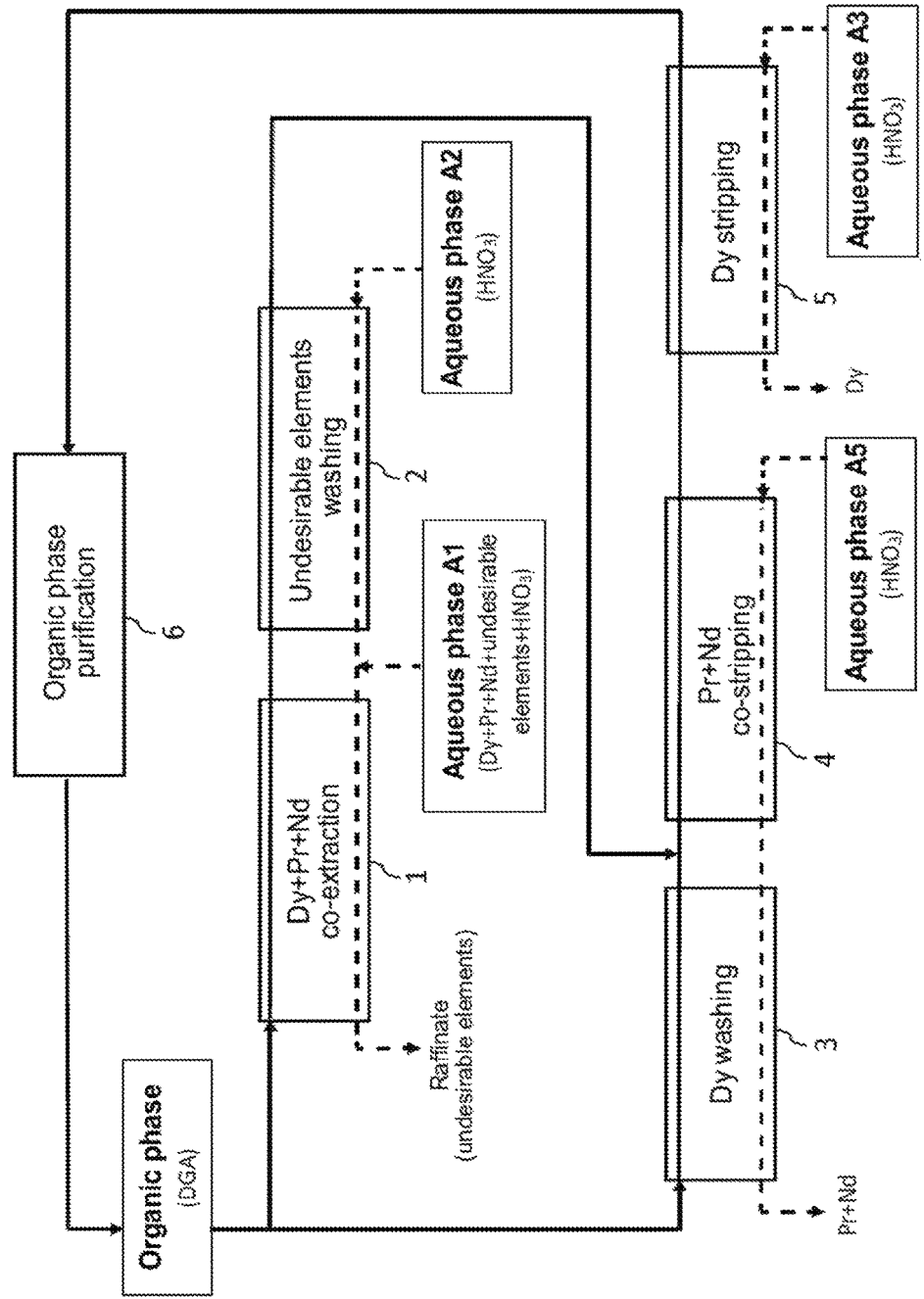
FIG. 3 illustrates the principle of a second preferred embodiment of the second method of the invention, applied to the processing, at an industrial scale, of a nitric aqueous phase stemming from the processing of spent or scrapped permanent magnets NdFeB, with view to selectively recovering dysprosium, praseodymium and neodymium present in this aqueous phase.
Figure 6:
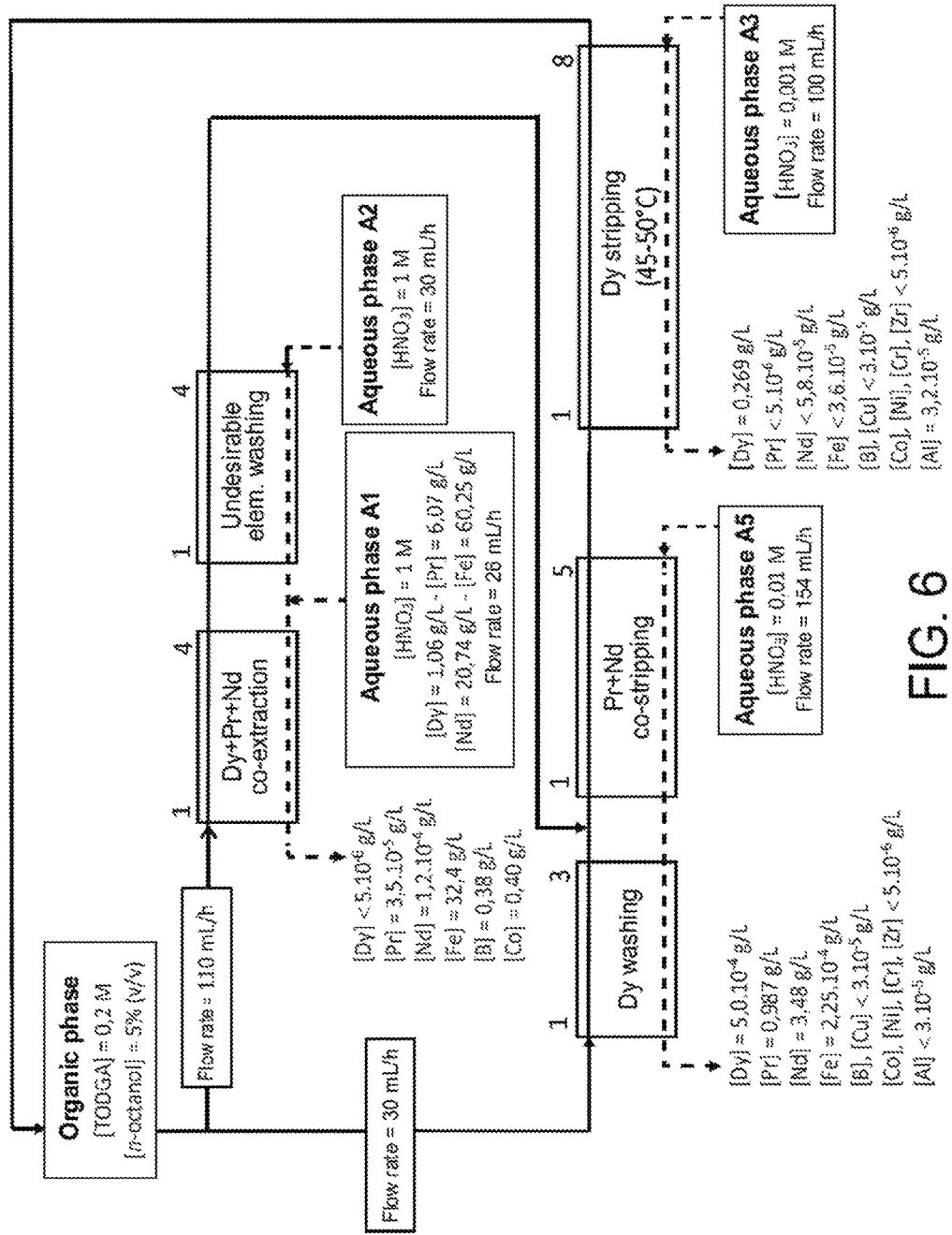

FIG. 6 illustrates the scheme which was used for testing, in mixers-decanters, the second preferred embodiment of the second method of the invention illustrated in FIG. 3.

Figure 2:
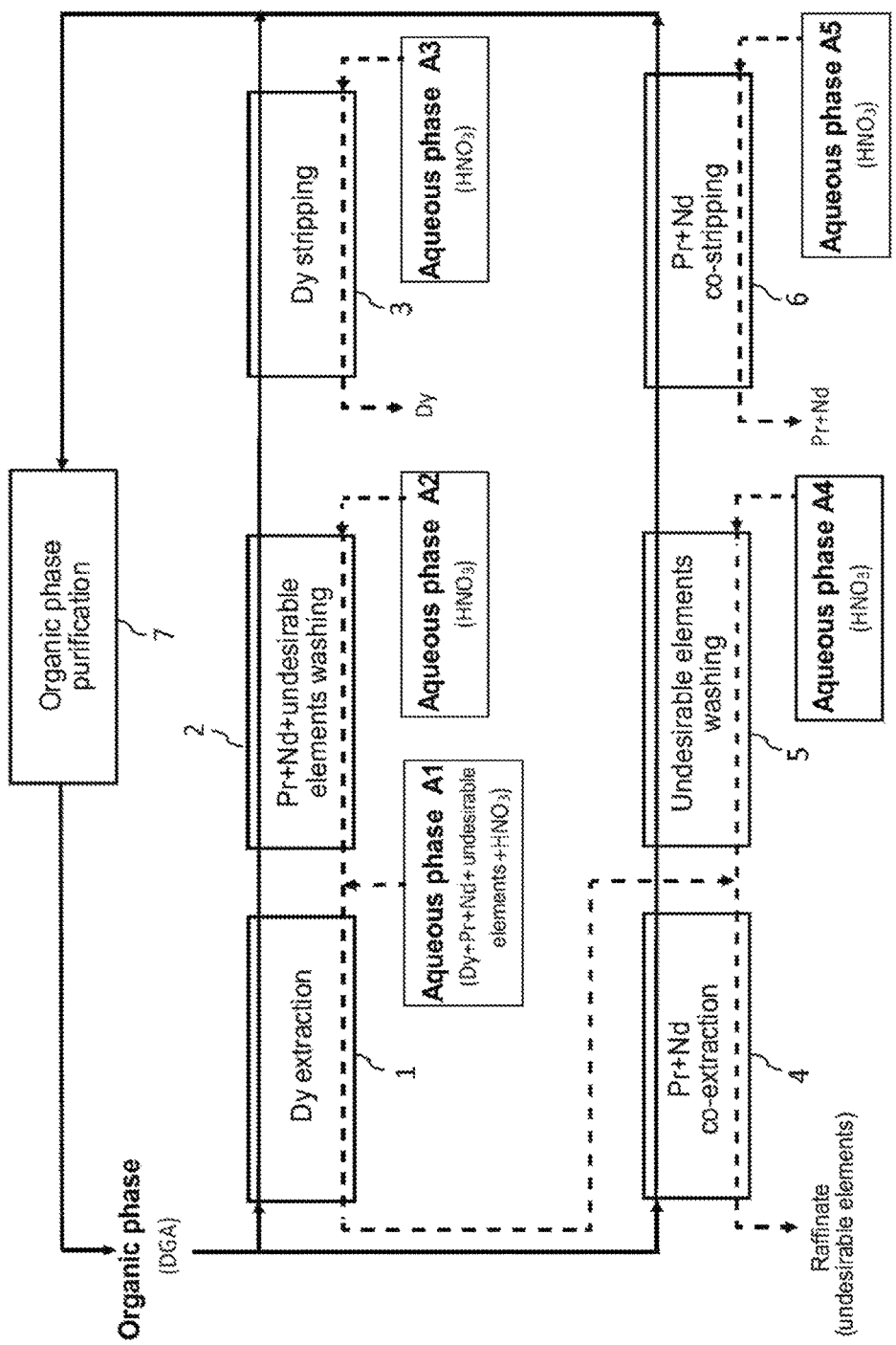
FIG. 2 illustrates the principle of a first preferred embodiment of the second method of the invention, applied to the processing, at an industrial scale of a nitric aqueous phase stemming from the processing of spent or scrapped permanent magnets NdFeB, with view to selectively recovering dysprosium, praseodymium and neodymium present in this aqueous phase.
Figure 7A:
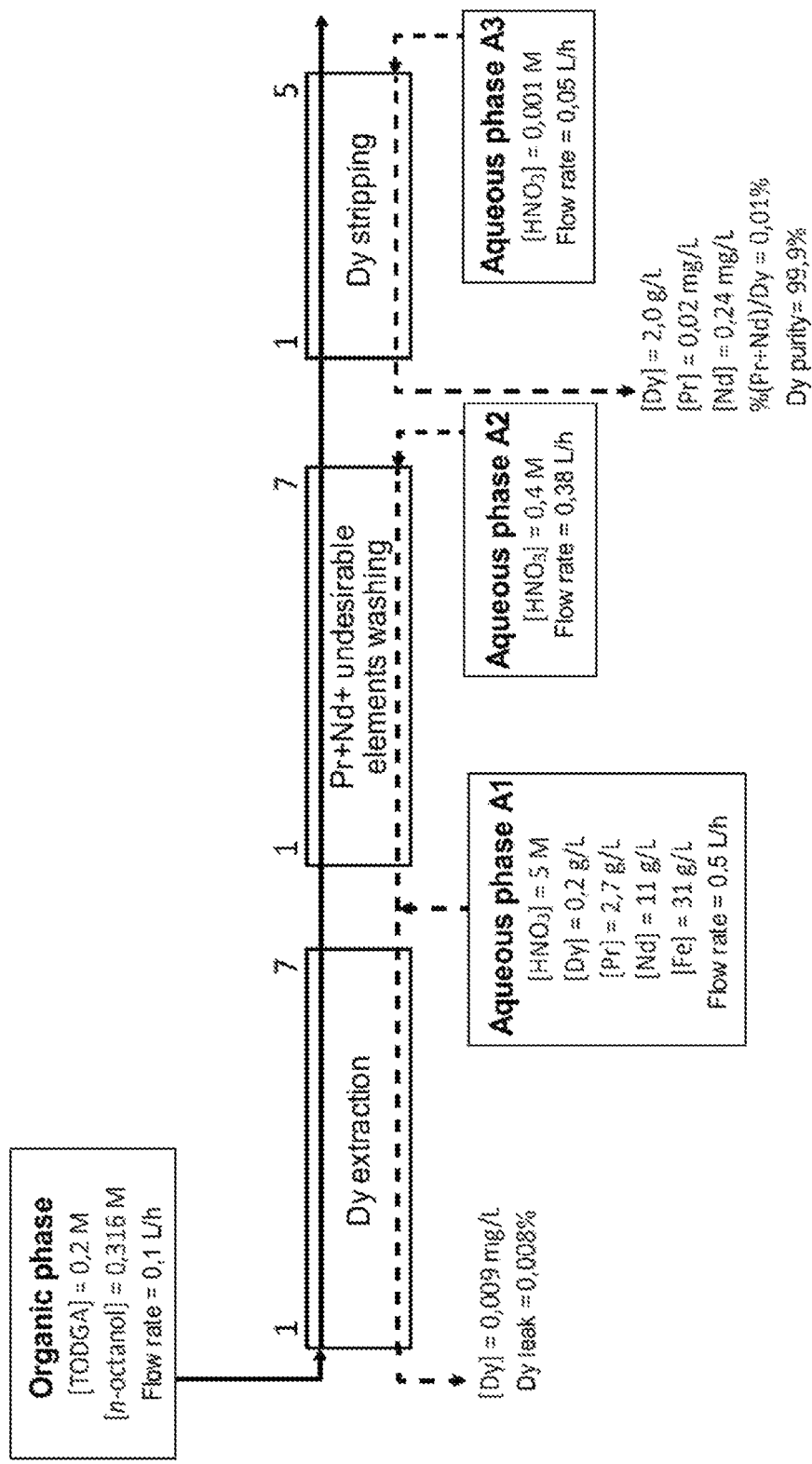
Figure 7B:
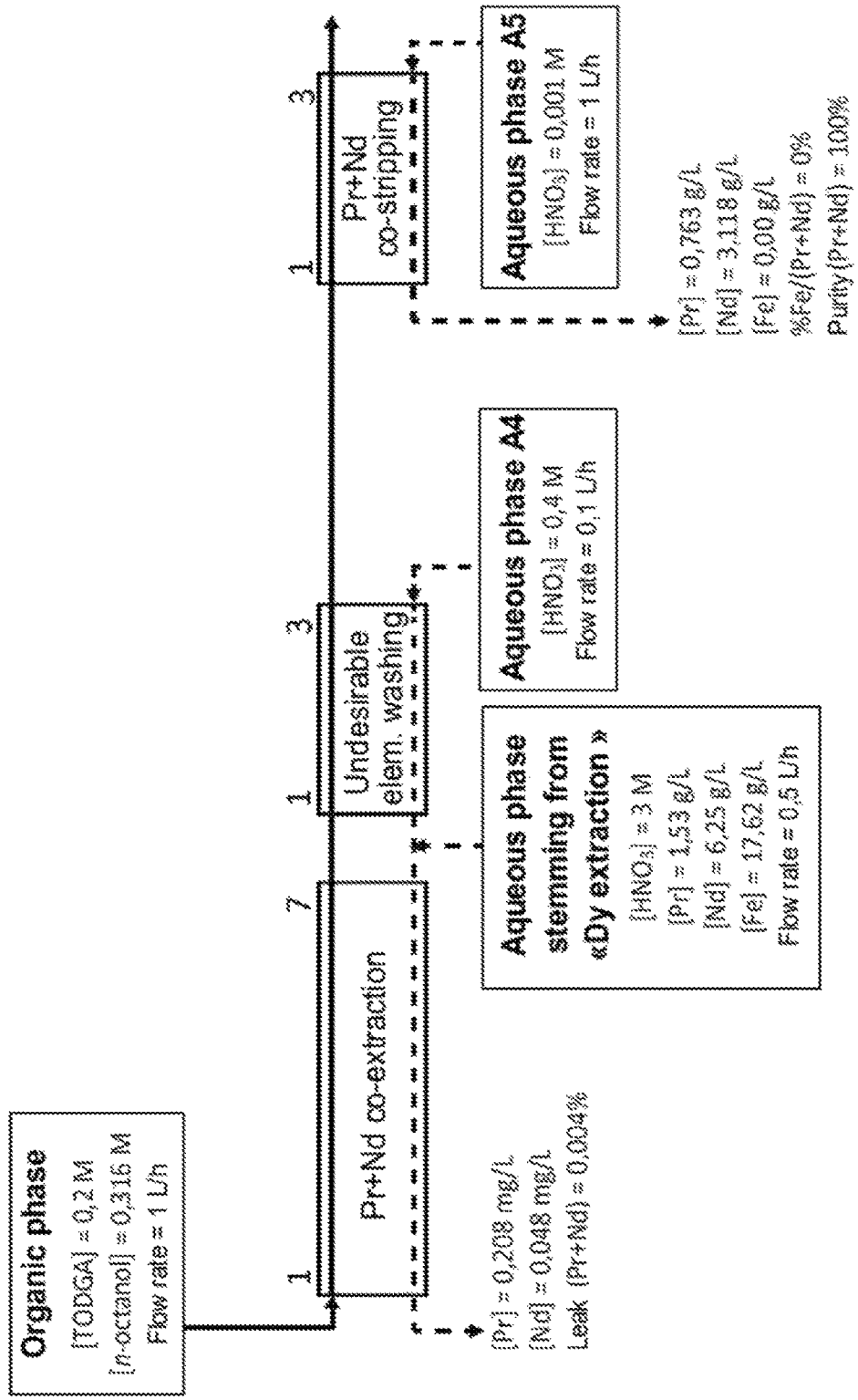

FIGS. 7A and 7B illustrate a scheme which may be used for the first preferred embodiment of the second method of the invention which is illustrated in FIG. 2; FIG. 7A corresponds to the steps of the first cycle of this embodiment except for the step of the purification of the organic phase while FIG. 7B corresponds to the steps of the second cycle of said embodiment except, there also, the step for purifying the organic phase.

In FIGS. 1 to 3, the rectangles referenced as 1 to 7 represent multistaged extractors such as those which are conventionally used for achieving liquid-liquid extractions at an industrial scale like for example, extractors consisting of batteries of mixers-decanters.

Moreover, in FIGS. 1 to 3 and 5 to 7B, the organic phase flows entering and leaving these extractors are symbolized with a solid line while the aqueous phase flows entering and leaving said extractors are symbolized by dotted lines.

DETAILED DISCUSSION OF THE INVENTION

Example 1: Principle Scheme of a Preferred Embodiment of the First Method of the Invention Reference is made to FIG. 1 which illustrates the principle of a preferred embodiment of the first method of the invention, designed for processing, at an industrial scale, a nitric aqueous phase stemming from the processing of spent or scrapped permanent magnets NdFeB, with view to selectively recovering dysprosium which is the most interesting economically one of the heavy rare earth metals present in this aqueous phase.

This aqueous phase is for example an aqueous phase stemming from the dissolution in a nitric medium, supplemented with an oxidizer, of a powder of permanent magnets NdFeB as obtained in the aforementioned reference [2].

Such an aqueous phase, which is designated hereafter and in FIG. 1 as "Aqueous phase A1", may comprise, according to the type of magnets from which it was obtained and from conditions under which the powder of magnets was dissolved in a nitric medium: from 0.2 mol/L to 6 mol/L of nitric acid, dysprosium, praseodymium, neodymium, iron and a certain number of metal impurities such as boron, nickel, copper, cobalt, chromium, aluminium, zirconium etc. This iron and these impurities will be grouped, in the following, under the term of "undesirable elements".

In the present embodiment, the method comprises a single cycle which aims at selectively recovering the dysprosium present in the aqueous phase A1.

This cycle comprises:
- a first step, designated as "Dy extraction" in FIG. 1, which aims at extracting dysprosium from the aqueous phase A1 by means of an organic phase not miscible with water;
- a second step, designated as "Pr+Nd+undesirable elements washing" in FIG. 1, which aims at washing the organic phase stemming from the "Dy extraction" by means of an acid aqueous phase A2 for removing from this organic phase the metal elements other than dysprosium which may have been partly extracted during the "Dy extraction";
- a third step, designated as "Dy stripping" in FIG. 1, which aims at stripping dysprosium from the organic phase stemming from the "Pr+Nd+undesirable elements washing" by means of an acid aqueous phase A3; and
- a fourth step, designated as "Organic phase purification" in FIG. 1, which aims at subjecting the organic phase from the "Dy stripping" to a series of processing operations allowing purifying this phase for its reuse in a subsequent cycle.

Practically, the "Dy extraction" is achieved in the extractor 1 by putting the aqueous phase A1 entering this extractor several times in contact, as a counter-current, with the organic phase which comprises a diglycolamide (noted as DGA in FIG. 1) in solution in an organic diluent.

As indicated earlier, the diglycolamide is selected from among lipophilic diglycolamides, i.e. for which the total number of carbon atoms is at least equal to 24 and more particularly, from among diglycolamides which fit the formula: $R(R^2)N-C(O)-CH_2-O-CH_2-C(O)-N(R^3)R^4$ wherein $R^1$ to $R^4$ represent branched or linear alkyl groups, each comprising at least 5 carbon atoms and even better, at least 8 carbon atoms, preference being given to the diglycolamides in which $R^1$ to $R^4$ represent identical alkyl groups with each other, comprising from 8 to 12 carbon atoms.

This diglycolamide is for example TODGA, TEHDGA or TdDDGA which are used at a concentration typically ranging from 0.05 mol/L to 1 mol/L, preferably from 0.05 mol/L to 0.4 mol/L, this concentration being 0.2 mol/L for example.

The organic phase may further comprise, notably when the alkyl groups $R^1$ to $R^4$ of the diglycolamide comprise less than 12 carbon atoms, a phase modifier able to avoid the formation of a third phase, for example n-octanol ($CH_3(CH_2)_6CH_2OH$), in which case the latter does not represent preferably more than 10% by volume of the volume of the organic phase.

As for the organic diluent, this is for example an aliphatic diluent such as n-dodecane, TPH or a kerosene such as Isane IP-185.

The organic phase leaving the extractor 1, which is loaded with dysprosium, is directed towards the extractor 2 dedicated to the "Pr+Nd+undesirable elements washing" while the aqueous phase leaving the extractor 1 (designated as "raffinate" in FIG. 1) is directed towards a unit for processing aqueous effluents of the method.

The "Pr+Nd+undesirable elements washing" is achieved in the extractor 2 by putting the organic phase entering this extractor several times into contact, as a counter-current, with the aqueous phase A2 which comprises nitric acid at a concentration which is at most equal to the nitric acid concentration of the aqueous phase A1 but which is preferably less than this concentration, each putting into contact being followed by a separation of the aqueous and organic phases. Typically, the nitric acid concentration of the aqueous phase A2 ranges from 0.01 mol/L to 0.5 mol/L depending on the nitric acid concentration of the aqueous phase A1 and preferably is equal to 0.01 mol/L.

The organic phase leaving the extractor 2 is directed towards the extractor 3 dedicated to the "Dy stripping" while the aqueous phase leaving the extractor 2 is sent back towards the extractor 1 where it joins up with the aqueous phase A1 and is added thereto.

The "Dy stripping" is achieved in the extractor 3 by putting the organic phase entering this extractor several times into contact, as a counter-current, with the aqueous phase A3 which comprises nitric acid as an acid and for which the nitric acid concentration is at most equal to 0.001 mol/L, typically comprised between 0.0001 mol/L and 0.001 mol/L and, preferably, equal to 0.001 mol/L, each putting into contact being followed by a separation of the aqueous and organic phases, and by preferably heating the extractor 3, typically to a temperature ranging from 40° C. to 55° C.

In order to facilitate the stripping of the dysprosium, the aqueous phase A3 may comprise, in addition to nitric acid, one or more compounds complexing the rare earth metals in an aqueous medium such as a hydrophilic diglycolamide, i.e. for which the total number of carbon atoms does not exceed 20, like TMDGA, TEDGA or TPDGA, a polyaminocarboxylic acid like HEDTA, NTA or DTPA, or a mono-, di- or tri-carboxylic acid like glycolic acid, malonic acid or mesoxalic acid.

At the end of the "Dy stripping", an aqueous phase is obtained which only contains dysprosium as a metal element, and an organic phase which is directed towards the extractor 4 dedicated to the "Organic phase purification" in order to be subject to a series of processing operations (acid washings, alkaline washings, complexing washings, etc.) able to get rid of the possible degradation products, notably from hydrolysis, and of residual metal elements which it contains.

Example 2: Principle Scheme of a First Preferred Embodiment of the Second Method of the Invention Now, reference is made to FIG. 2 which illustrates the principle of a first preferred embodiment of the second method of the invention, in which this method is designed for processing at an industrial scale, an acid aqueous phase A1 similar to the one treated in the Example 1 hereinbefore but with view to selectively recovering, not only the dysprosium but also the praseodymium and neodymium, and this, in two cycles, i.e.: a first cycle which aims at selectively recovering dysprosium present in the aqueous phase A1 and a second cycle which itself aims at selectively recovering praseodymium and neodymium present in the raffinate of the first cycle.

The first cycle comprises:
- a first step, designated as "Dy extraction" in FIG. 2, which aims at extracting dysprosium from the aqueous phase A1 by means of a first organic phase not miscible with water;
- a second step, designated as "Pr+Nd+undesirable elements washing" in FIG. 2, which aims at washing the organic phase stemming from the "Dy extraction" by means of an acid aqueous phase A2 for removing from this organic phase the metal elements other than dysprosium which may have been partly extracted during the "Dy extraction";

a third step, designated as "Dy stripping" in FIG. 2, which aims at stripping the dysprosium from the organic phase stemming from the "Pr+Nd+undesirable elements washing" by means of an acid aqueous phase A3;

while the second cycle comprises:
a first step, designated as "Pr+Nd co-extraction" in FIG. 2, which aims at extracting praseodymium and neodymium from the aqueous phase stemming from the "Dy extraction" by means of a second organic phase having the same qualitative and quantitative composition as the first organic phase;

a second step, designated as "Undesirable elements washing" in FIG. 2, which aims at washing the organic phase stemming from the "Pr+Nd co-extraction" by means of an acid aqueous phase A4 for removing from this organic phase the metal elements other than praseodymium and neodymium which may have been partly extracted during the "Pr+Nd co-extraction"; and a third step, designated as "Pr+Nd co-stripping" in FIG. 2, which aims at stripping praseodymium and neodymium from the organic phase stemming from the "Undesirable elements washing" by means of an acid aqueous phase A5.

The first and second cycles further comprise, a common step, designated as "Organic phase purification" in FIG. 2, which binds them with each other and which aims at subjecting the organic phase formed by the gathering of the organic phases respectively stemming from the "Dy stripping" and from the "Pr+Nd co-stripping" to a series of processing operations allowing purifying this phase for its reuse, after dividing it into two, in the subsequent first and second cycles.

The steps "Dy extraction", "Pr+Nd+undesirable elements washing", "Dy stripping" and "organic phase purification" are carried out, respectively in the extractors 1, 2, 3 and 7, in the same way as in Example 1.

On the other hand, unlike Example 1, the aqueous phase leaving the extractor 1 is directed towards the extractor 4 dedicated to the "Pr+Nd co-extraction" instead of being directed towards a unit for processing aqueous effluents of the method.

The "Pr+Nd co-extraction" is achieved by putting the aqueous phase entering the extractor 4 several times into contact, as a counter-current, with the second organic phase, each putting into contact being followed by a separation of the aqueous and organic phases. An increase in the concentration of nitric acid of the aqueous phase stemming from the "Dy extraction" may be achieved, before entry or during entry of this aqueous phase into the extractor 4, in order to promote the extraction of praseodymium and of neodymium by the diglycolamide.

The organic phase leaving the extractor 4, which is loaded with praseodymium and neodymium, is directed towards the extractor 5 dedicated to the "Undesirable elements washing" while the aqueous phase leaving the extractor 4 (designated as "raffinate" in FIG. 2) is directed towards a unit for processing aqueous effluents of the method.

The "Undesirable elements washing" is achieved in the extractor 5 by putting the organic phase entering this extractor several times into contact, as a counter-current, with the aqueous phase A4 which comprises nitric acid at a concentration which is at most equal to la nitric acid concentration of the aqueous phase stemming from the "Dy extraction" but which is preferably less than this concentration, each putting into contact being followed by a separation of the aqueous and organic phases. Typically, the nitric acid concentration of the aqueous phase A4 ranges from 0.2 mol/L to 4 mol/L depending on the nitric acid concentration of the aqueous phase stemming from the "Dy extraction" and preferably is equal to 1 mol/L.

The organic phase leaving the extractor 5 is directed towards the extractor 6 dedicated to the "Pr+Nd co-stripping" while the aqueous phase leaving the extractor 5 is sent back towards the extractor 4 where it joins up with the aqueous phase stemming from the "Dy extraction" and is added thereto.

The "Pr+Nd co-stripping" is achieved in the extractor 6, at room temperature or under hot conditions (45°-50° C.), by putting the organic phase entering this extractor several times in contact, as a counter-current, with the aqueous phase A5 which comprises nitric acid as an acid and for which the nitric acid concentration is at most equal to 0.001 mol/L, typically comprised between 0.0001 mol/L and 0.001 mol/L and is preferably equal to 0.001 mol/L, each putting into contact being followed by a separation of the aqueous and organic phases.

In order to promote the stripping of praseodymium and neodymium, the aqueous phase A5 may comprise, in addition to nitric acid, one or more agents complexing the rare earth metals of the same type as those which may be used for the "Dy stripping".

At the end of the "Pr+Nd co-stripping", an aqueous phase is obtained which does not contain any longer praseodymium and neodymium as metal elements, and an organic phase which joins up with the organic phase stemming from the "Dy stripping" and is directed, together with the latter, towards the extractor 7 dedicated to the "Organic phase purification".

Example 3: Principle Scheme of a Second Preferred Embodiment of the Second Method of the Invention Reference is made now to FIG. 3 which illustrates the principle of a second preferred embodiment of the second method of the invention, wherein this method is also designed for selectively recovering and at an industrial scale dysprosium, praseodymium and neodymium from an acid aqueous phase A1 similar to the one processed in Example 1 hereinbefore but in a single cycle.

This cycle comprises:
a first step, designated as "Dy+Pr+Nd co-extraction" in FIG. 3, which aims at co-extracting dysprosium, praseodymium and neodymium from the aqueous phase A1 by means of a first organic phase not miscible with water;

a second step, designated as "Undesirable elements washing" in FIG. 3, which aims at washing the organic phase stemming from the "Dy+Pr+Nd co-extraction" by means of an acid aqueous phase A2 for removing from this organic phase the metal elements other than dysprosium, praseodymium and neodymium which may have been partly extracted during the "Dy+Pr+Nd co-extraction";

a third step, designated as "Pr+Nd co-stripping" in FIG. 3, which aims at selectively stripping praseodymium and neodymium from the organic phase stemming from the "Undesirable elements washing" by means of an acid aqueous phase A5;

a fourth step, designated as "Dy washing" in FIG. 3, which aims at removing from the aqueous phase stemming from the "Pr+Nd co-stripping" the dysprosium fraction that has been stripped during this co-stripping, by means of a second organic phase having the same qualitative et quantitative composition as the first organic phase;

a fifth step, designated as "Dy stripping" in FIG. 3, which aims at selectively stripping dysprosium from the organic phase stemming from the "Pr+Nd co-stripping" by means of an acid aqueous phase A3; and a sixth step, designated as "Organic phase purification" in FIG. 3, which aims at subjecting the organic phase stemming from the "Dy stripping" to a series of processing operations allowing purifying this phase for its reuse, after having been divided into two, in a subsequent cycle.

The "Dy+Pr+Nd co-extraction" is achieved in the extractor 1 in the same way as the « Dy extraction» of Examples 1 and 2.

The organic phase leaving the extractor 1, which is loaded with dysprosium, praseodymium and neodymium, is directed towards the extractor 2 dedicated to the "Undesirable elements washing" while the aqueous phase leaving the extractor 1 (designated as "raffinate" in FIG. 3) is directed towards a unit for processing aqueous effluents of the method.

The "Undesirable elements washing" is achieved in the extractor 2 by putting the organic phase entering this extractor several times into contact, as a counter-current, with the aqueous phase A2 which, in this case, typically comprises a nitric acid concentration which is comprised between 0.2 mol/L and 4 mol/L depending on the nitric acid concentration of the aqueous phase A1 and preferably is equal to 1 mol/L, each putting into contact being followed by a separation of the aqueous and organic phases.

The organic phase leaving the extractor 2 is directed towards the extractor 4 dedicated to the "Pr+Nd co-stripping" while the aqueous phase leaving the extractor 2 is sent back towards the extractor 1 where it joins up with the aqueous phase A1 and is added thereto.

The "Pr+Nd co-stripping" is achieved in the extractor 4 in the same way as the "Pr+Nd co-stripping" of Example 2, except, on the one hand, the aqueous phase A5 has a nitric acid concentration ranging from 0.005 mol/L to 0.1 mol/L, for example 0.01 mol/L, and, on the other hand, it is achieved at room temperature, and this, so as to limit the amount of dysprosium which may be stripped together with praseodymium and neodymium.

The aqueous phase leaving the extractor 4 is sent back towards the extractor 3 dedicated to the "Dy washing" while the organic phase leaving the extractor 4 is directed towards the extractor 5 dedicated to the "Dy stripping".

The "Dy washing" is achieved in the extractor 3 by putting the aqueous phase stemming from the extractor 4 several times in contact, as a counter-current, with the second organic phase, each putting into contact being followed by a separation of the aqueous and organic phases. At the end of this washing, an aqueous phase is obtained which does not contain any more praseodymium and neodymium as metal elements, and an organic phase which is directed towards the extractor 4 where it joins up with the organic phase stemming from the extractor 2 and is added thereto.

The "Dy stripping" is achieved in the extractor 5 in the same way as in Examples 1 and 2.

At the end of the "Dy stripping", an aqueous phase is obtained which only contains dysprosium as a metal element, and an organic phase which is directed towards the extractor 6 dedicated to the "Purification of the organic phase".

Example 4: Experimental Validation of the Invention 4.1—Tests in Test Tubes:

In the tests which follow, the concentrations of the different metal elements in the aqueous solutions or phases, were all measured by atomic emission spectrometry with a plasma torch, further known under the acronym ICP-AES.

The concentrations of the metal elements in the organic phases were estimated after having stripped these elements in an aqueous phase which is strongly complexing (oxalic acid=0.5 mol/L; TEDGA=0.2 mol/L; HNO$_3$=1 mol/L; volume ratio O/A=1/5; duration of the stirring=10 minutes; temperature=25° C.) and after having measured the concentrations of said elements in the aqueous phase obtained at the end of this stripping.

Moreover, the distribution coefficients and the separation factors were determined according to the conventions in the field of liquid-liquid extractions, i.e.:

the distribution coefficient of a metal element M, noted as $D_M$, between two phases, respectively an organic and aqueous phase, is equal to:

$$D_M = \frac{[M]_{org.}}{[M]_{aq.}}$$

with:

$[M]_{org.}$=concentration of the metal element in the organic phase at extraction equilibrium (in g/L); and $[M]_{aq.}$=concentration of the metal element in the aqueous phase at extraction equilibrium (in g/L);

the separation factor between two metal elements M1 and M2, noted as $FS_{M1/M2}$, is equal to:

$$FS_{M1/M2} = \frac{D_{M1}}{D_{M2}}$$

with:

$D_{M1}$=distribution coefficient of the metal element M1; and $D_{M2}$=distribution coefficient of the metal element M2.

4.1.1—Extraction Tests Carried Out on Synthetic Nitric Aqueous Phases Comprising Boron, Iron, Praseodymium, Neodymium and Dysprosium:

Extraction tests are carried out in tubes, by using:

as organic phases: phases comprising either 0.2 mol/L of TODGA in n-dodecane or 0.2 mol/L of TODGA and 5% (v/v) of n-octanol (as a phase modifier) in n-dodecane; and as aqueous phases: phases obtained by dissolution of boric acid and of hydrated iron nitrates, of praseodymium, of neodymium and dysprosium in an aqueous solution of nitric acid; all these phases have the boron, iron, praseodymium, neodymium and dysprosium concentrations which are indicated in the table I hereafter but their nitric acid concentration varies from 0.1 mol/L to 2.6 mol/L.

TABLE I

| Elements | Concentrations (g/L) |
|---|---|
| B | 1.3 |
| Fe | 43.7 |

TABLE I-continued

| Elements | Concentrations (g/L) |
|---|---|
| Pr | 1.1 |
| Nd | 10.3 |
| Dy | 1.0 |

Each organic phase is put into contact, with stirring, with one of the aqueous phases, volume by volume, for 30 minutes at 25° C., and then these phases are separated from each other after centrifugation.

The results of these tests show that there is no formation of a third phase when the organic phase used for the extraction comprises n-octanol and this, regardless of the acidity of the tested aqueous phase. On the other hand, a third phase forms in the absence of n-octanol in the organic phase.

As visible in FIG. 4A, which illustrates the distribution coefficients of the different metal elements according to the nitric acid concentration of the tested aqueous phases, a quantitative extraction of dysprosium ($D_{Dy}$>100) is obtained for the whole of these phases.

The iron, which is the most abundant element in the aqueous phases is very little extracted ($D_{Fe}$<0.01).

Moreover, as shown in FIG. 4B, which illustrates the separation factors between the dysprosium and the other metal elements depending on the nitric acid concentration of the tested aqueous phases, the separation of dysprosium relatively to iron and boron is excellent since the separation factors $FS_{Dy/Fe}$ and $FS_{Dy/B}$ are respectively greater than 10,000 and 750. Further, separation factors $FS_{Dy/Nd}$ and $FS_{Dy/Pr}$ of greater than 10 are obtained regardless of the acidity of the tested aqueous phases.

These results show that it is therefore possible to easily recover dysprosium from an acid aqueous phase comprising high concentrations of iron, boron, neodymium and praseodymium by using a diglycolamide as an extractant.

4.1.2—Recovery of Dysprosium, Neodymium and Praseodymium from an Aqueous Phase Stemming from the Dissolution of a Powder of Permanent Magnets NdFeB in a 5.15 M Nitric Medium:

An aqueous phase is prepared by dissolving a powder of scrapped permanent magnets NdFeB in a nitric medium 5.15 M supplemented with $H_2O_2$ (1% by volume) as described in the aforementioned reference [2], the powder of permanent magnets having itself been obtained by demagnetization of these magnets by means of a heat treatment in an oven (200° C.-5 hours), milling and then treatment by hydridation-dehydridation.

The concentrations of metal elements of the aqueous phase thereby obtained are indicated in the table II hereafter.

TABLE II

| Elements | Concentrations (g/L) |
|---|---|
| B | 0.4 |
| Fe | 36 |
| Co | 0.2 |
| Ni | 0.8 |
| Cu | 0.5 |
| Pr | 2.9 |
| Nd | 11 |
| Dy | 0.2 |

Extraction Test:

The aqueous phase obtained earlier is subject to an extraction test which is conducted by using as an organic phase, a phase comprising 0.2 mol/L of TODGA and 5% (v/v) of n-octanol in n-dodecane. To do this, the aqueous phase is put with stirring in contact with this organic phase in a volume ratio O/A of 1, for 30 minutes at 25° C., and then these phases are separated from each other by decantation.

Table III hereafter shows the distribution coefficients of the different metal elements, the separation factors $FS_{Dy/M}$ and $FS_{Pr/M}$ as well as the concentration of the aqueous phase of nitric acid at equilibrium obtained for this extraction test.

TABLE III

| Elements | $D_M$ | $FS_{Dy/M}$ | $FS_{Pr/M}$ | $[HNO_3]_{eq.}$ |
|---|---|---|---|---|
| B | 0.06 | 383 | 8.3 | 4.76M |
| Fe | <0.004 | >5,750 | >125 | |
| Co | <0.02 | >1,150 | >25 | |
| Ni | <0.005 | >4,600 | >100 | |
| Cu | <0.04 | >575 | >12.5 | |
| Pr | 0.5 | 46 | 1.0 | |
| Nd | 1.3 | 18 | 0.4 | |
| Dy | 23 | 1.0 | 0.02 | |

This table confirms the quantitative extraction of dysprosium ($D_{Dy}$=23) obtained earlier during the extraction tests conducted at point 4.1.1 and before on synthetic nitric aqueous phases.

The strong selectivity which TODGA exhibits for dysprosium as compared with the other metal elements, including the light rare earth metals, is also confirmed since the separation factors $FS_{Dy/Pr}$ and $FS_{Dy/Nd}$ are respectively 46 and 18.

Finally, it shows that it is possible to efficiently separate, after having extracted dysprosium from the aqueous phase, didymium Pr+Nd of the other metal elements still present in this aqueous phase by using the same organic phase as the one used for extracting dysprosium.

Stripping Tests:

The organic phase obtained at the end of the extraction test hereinbefore is subject to a series of stripping tests which are carried out by using as an aqueous phase, an aqueous solution of nitric acid at 0.001 mol/L (pH 3).

To do this, aliquots of the aqueous phase are put into contact a first time (hereafter "contact 1"), with stirring, with aliquots of the organic phase in a volume ratio O/A of 1/5, for 30 minutes at 25° C., 40° C. or 55° C., and then these aliquots are separated from each other by decantation.

The concentrations of metal elements as well as the pH of the aliquots of aqueous phase thereby separated are measured, after which these aliquots are again put into contact (hereafter "contact 2") with aliquots of the organic phase under the same conditions as earlier.

Table IV hereafter shows the distribution coefficients of dysprosium, neodymium and praseodymium obtained for these stripping tests. The pH exhibited by the aliquots of aqueous phase after each of the contacts 1 and 2 are also indicated in this table.

TABLE IV

| | | Stripping at 25° C. | | Stripping at 40° C. | | Stripping at 55° C. | |
|---|---|---|---|---|---|---|---|
| | | Contact 1 | Contact 2 | Contact 1 | Contact 2 | Contact 1 | Contact 2 |
| Elements | Dy | 20.2 | 0.9 | 3.8 | 0.65 | 0.73 | 0.86 |
| | Nd | 0.60 | 0.15 | 0.13 | <0.1 | 0.05 | <0.05 |
| | Pr | 0.6 | <0.3 | 0.10 | <0.1 | 0.05 | <0.05 |
| $pH_{after\ contact}$ | | 1.2 | 3.0 | 1.2 | 3.0 | 1.2 | 3.0 |

This table shows that at 25° C., stripping of dysprosium is only efficient at the second contact ($D_{Dy}$<1) when the pH is greater than 1 (pH 3). It also shows that it is possible to improve the stripping of dysprosium at the first contact by carrying out this stripping at a higher temperature. Thus at 55° C., a distribution coefficient of less than 1 ($D_{Dy}$=0.7) is obtained for dysprosium as soon as the first contact at a pH of 1.16 at equilibrium.

On the other hand, good stripping of the didymium Pr+Nd is observed as soon as the first contact and this, regardless of the temperature, this stripping being however improved by an increase in the temperature.

4.1.3—Recovery of Dysprosium from an Aqueous Phase Stemming from the Dissolution of a Powder of Permanent Magnets NdFeB in a 0.4 M Nitric Medium:

An aqueous phase is prepared by dissolving a powder of scrapped permanent magnets NdFeB in a 0.4 M nitric medium in the same way as in point 4.1.2 hereinbefore, except that the aqueous solution used for dissolving the resulting powder from the hydridation-dehydridation process is an aqueous solution of nitric acid at 0.4M.

The concentrations of metal elements of the thereby obtained aqueous phase are indicated in table V hereafter.

TABLE V

| Elements | Concentrations (g/L) |
|---|---|
| B | 0.4 |
| Fe | 32 |
| Co | 0.2 |
| Ni | 0.08 |
| Cu | 0.1 |
| Pr | 2.7 |
| Nd | 11 |
| Dy | 0.2 |

Then, from this aqueous phase, an extraction test is carried out followed by a series of stripping tests under the same conditions as those described under point 4.1.2 hereinbefore.

Table VI hereafter shows the distribution coefficients of the different metal elements, the separation factors $FS_{Dy/M}$ and $FS_{Pr/M}$ as well as the concentration of the aqueous phase of nitric acid at equilibrium obtained for the extraction test while table VII hereafter shows the distribution coefficients of dysprosium, neodymium and praseodymium obtained for the stripping tests. The pH exhibited by the aliquots of aqueous solution after contact 1 are also indicated in this table.

TABLE VI

| Elements | $D_M$ | $FS_{Dy/M}$ | $FS_{Pr/M}$ | $[HNO_3]_{eq.}$ |
|---|---|---|---|---|
| B | 0.12 | 225 | 14 | 0.34M |
| Fe | <0.002 | >3,500 | >857 | |
| Co | <0.02 | >1,350 | >85 | |
| Ni | <0.05 | >540 | >34 | |

TABLE VI-continued

| Elements | $D_M$ | $FS_{Dy/M}$ | $FS_{Pr/M}$ | $[HNO_3]_{eq.}$ |
|---|---|---|---|---|
| Cu | <0.17 | 158 | 10 | |
| Pr | 1.7 | 15.9 | 1.0 | |
| Nd | 2.1 | 12.8 | 0.8 | |
| Dy | 27 | 1.0 | 0.06 | |

TABLE VII

| | | $D_M$ | | |
|---|---|---|---|---|
| | | Stripping at 25° C. Contact 1 | Stripping at 40° C. Contact 1 | Stripping at 55° C. Contact 1 |
| Elements | Dy | 5.4 | 0.76 | 0.23 |
| | Nd | 0.17 | 0.05 | 0.02 |
| | Pr | 0.11 | 0.04 | 0.02 |
| $pH_{after\ contact}$ | | 2.0 | 2.0 | 2.0 |

Table VI shows that it is also possible to extract and efficiently separate dysprosium on the one hand, and the didymium Pr+Nd on the other hand, from the other metal elements (by considering the separation factors $FS_{Pr/element}$ as dimensioning for the separation) from an aqueous phase with a concentration much less than that of the aqueous phase used under point 4.1.2 hereinbefore (0.4 M versus 5.15 M). However, the selectivity of TODGA for dysprosium as compared with praseodymium and neodymium appears to be less than the one observed for the aqueous phase used under point 4.1.2 hereinbefore, so that it seems preferable that the solution from the dissolution of a powder of permanent magnets NdFeB from which dysprosium is extracted has a nitric acid concentration significantly greater than 0.4 M.

Table VII itself confirms that it is possible to strip the rare earth metals comprising TODGA as an extractant by means of a very diluted nitric acid aqueous phase (pH 3) and that this stripping is improved by increasing the temperature.

4.1.4—Influence of the Nature of the Alkyl Chains of the Diglycolamide:

Extraction Tests are Carried Out in Tubes, by Using:
  as organic phases: phases comprising 0.2 mol/L of one of the following diglycolamides: TODGA, TEHDGA or TdDDGA, with or without 5% (v/v) of n-octanol (as a phase modifier), in n-dodecane; and
  as aqueous phases: the aqueous phases stemming from the dissolution of a powder of permanent magnets NdFeB in a 5.15 M and 0.4 M nitric medium, respectively prepared under points 4.1.2 and 4.1.3 hereinbefore.

These extraction tests are carried out under the same conditions as the ones described under point 4.1.2 hereinbefore.

Table VIII hereafter shows the distribution coefficients of dysprosium, of neodymium, of praseodymium, of iron and of boron as well as the pH exhibited by the aqueous phases at equilibrium.

TABLE VIII

| | | Organic phases | | | | | |
|---|---|---|---|---|---|---|---|
| | | TODGA | | TEHDGA | | TdDDGA | |
| | | 5% octanol | 0% octanol | 5% octanol | 0% octanol | 5% octanol | 0% octanol |
| Aqueous phase 5.15M | $D_{Dy}$ | 23 | $3^{rd}$ phase | $3^{rd}$ phase | $3^{rd}$ phase | 24.9 | 25.3 |
| | $D_{Nd}$ | 1.4 | $3^{rd}$ phase | $3^{rd}$ phase | $3^{rd}$ phase | 1.65 | 1.65 |
| | $D_{Pr}$ | 0.5 | $3^{rd}$ phase | $3^{rd}$ phase | $3^{rd}$ phase | 1.61 | 1.62 |
| | $D_{Fe}$ | <0.004 | $3^{rd}$ phase | $3^{rd}$ phase | $3^{rd}$ phase | 0.002 | 0.002 |
| | $D_B$ | 0.06 | $3^{rd}$ phase | $3^{rd}$ phase | $3^{rd}$ phase | 0.09 | 0.03 |
| | $[HNO_3]_{eq}$ (M) | 4.76 | $3^{rd}$ phase | $3^{rd}$ phase | $3^{rd}$ phase | 4.71 | 4.88 |
| Aqueous phase 0.4M | $D_{Dy}$ | 27 | $3^{rd}$ phase | 3.08 | $3^{rd}$ phase | 29.8 | 30.1 |
| | $D_{Nd}$ | 2.4 | $3^{rd}$ phase | 3.90 | $3^{rd}$ phase | 2.42 | 2.55 |
| | $D_{Pr}$ | 1.7 | $3^{rd}$ phase | 3.54 | $3^{rd}$ phase | 1.67 | 2.02 |
| | $D_{Fe}$ | <0.002 | $3^{rd}$ phase | 0.001 | $3^{rd}$ phase | 0.001 | <0.001 |
| | $D_B$ | 0.08 | $3^{rd}$ phase | 0.13 | $3^{rd}$ phase | 0.17 | 0.04 |
| | $[HNO_3]_{eq}$ (M) | 0.34 | $3^{rd}$ phase | 0.33 | $3^{rd}$ phase | 0.31 | 0.33 |

This table first of all shows that a third phase does not form when TdDDGA is used as an extractant, even in the absence of the phase modifier in the organic phase. On the other hand, the use of TODGA or TEHDGA leads, in the absence of a phase modifier, to the formation of a third phase. A $3^{rd}$ phase is also observed with TEHDGA with 5% of n-octanol in the case of the aqueous phase with higher acidity ($HNO_3$ 5.15 M).

As already illustrated in the literature, the loading capacity of TdDDGA is greater than those of the extractants TODGA and TEHDGA. The use of TdDDGA would therefore have the advantage of avoiding the use of a phase modifier in the working of the method of the invention.

This table also shows that in the case of TdDDGA, the distribution coefficients of dysprosium, neodymium, praseodymium, iron and boron are comparable between the tests carried out with and without n-octanol in the organic phases, which shows the absence of any impact of this phase modifier on the distribution coefficients of the metal elements.

The obtained distribution coefficients, for a same metal element, with TODGA and TdDDGA are very close to each other and this, regardless of the acidity of the aqueous phase. The rare earth metals are quantitatively extracted with TdDDGA with excellent selectivity towards the other metal elements. TdDDGA has a slightly greater extracting power than TODGA (notably in the case of praseodymium) while that, in the case of the aqueous phase with lower acidity ($HNO_3$ 0.4 M), TEHDGA exhibits a much lower extracting power than the two other diglycolamides and leads to lower selectivities among rare earth metals (Dy/Nd notably).

These results confirm the excellent capability which TODGA, TEHDGA and TdDDGA have for separating rare earth metals from the other metal elements and notably from iron. TdDDGA appears to be particularly well indicated for recovering dysprosium, and then praseodymium and neodymium, from an acid aqueous solution from the dissolution of a powder of permanent magnets because of its strong extracting power but also from the fact that it gives the possibility of avoiding the use of a phase modifier.

4.2—Tests in Mixers-Decanters:

4.2.1—Recovery of Dysprosium from an Aqueous Phase from the Dissolution of a Powder of Permanent Magnets NdFeB in a 1 M Nitric Medium:

A test is conducted in mixers-decanters for verifying the possibility of quantitatively recovering dysprosium and this, selectively towards the other metal elements, from an aqueous phase A1 stemming from the dissolution of a powder of permanent magnets NdFeB in a 1 M nitric medium, by applying the preferred embodiment of the first method of the invention which is illustrated in FIG. 1.

The installation used for carrying out this test is represented in FIG. 5.

As shown by this figure, the installation comprises three batteries of mixers-decanters:
- a first battery with 3 stages of mixers-decanters dedicated to the "Dy extraction";
- a second battery with 5 stages of mixers-decanters dedicated to the "Pr+Nd+undesirable elements washing"; and
- a third battery with 8 stages of mixers-decanters dedicated to the "Dy stripping".

The aqueous phase A1, which was prepared as described under points 4.1.2 and 4.1.3 hereinbefore, comprises 0.69 g/L of dysprosium, 0.020 g/L of praseodymium, 6.62 g/L of neodymium, 1.9 g/L of iron and 1 mol/L of nitric acid, while the organic phase used for the "Dy extraction" comprises 0.2 mol/L of TODGA and 5% (v/v) of n-octanol in TPH.

The steps "Dy extraction" and "Pr+Nd+undesirable elements washing" are carried out at room temperature while the "Dy stripping" is carried out at a temperature from 45° C. to 50° C.

After the "Dy stripping", the organic phase is recycled at the head of the method after controlling its concentration in TODGA and a possible adjustment of this concentration.

The test is carried out continuously for 20 hours.

Its proper functioning is followed by analyzing regular samplings in diverse points of the installation.

At the end of the test, the different aqueous and organic phases are collected and analyzed with the purpose of evaluating the performances of the method.

The results of these analyses are reported in FIG. 5. They show that, under the conditions of the test, dysprosium is quantitatively recovered (about 99.7%) with an excellent degree of purity (>99.99%) towards the other metal elements present in the magnets (Nd, Pr, Fe, Co, B, Ni, Al, etc.). Dysprosium is moreover concentrated by a factor 6 with the method since its concentration, initially of 0.69 g/L in the aqueous phase A1, is 4.05 g/L in the aqueous phase stemming from the "Dy stripping".

Further it should be noted that all the metal elements have a concentration of less than 0.001 g/L in the recycled organic phase.

4.2.2—Recovery of Dysprosium, Neodymium and Praseodymium from an Aqueous Phase Stemming from the Dissolution of a Powder of Permanent Magnets NdFeB in a 1 M Nitric Medium:

A test is also carried out in mixers-decanters for verifying the possibility of quantitatively recovering dysprosium, praseodymium and neodymium, and this, selectively with regard to the other metal elements, from an aqueous phase A1 stemming from the dissolution of a powder of permanent magnets NdFeB in a 1 M nitric medium, by applying the second preferred embodiment of the second method of the invention which is illustrated in FIG. 3.

The installation used for carrying out this test is illustrated in FIG. 6.

As shown by this figure, the installation comprises five batteries of mixers-decanters:

a first battery with 4 stages of mixers-decanters dedicated to the "Dy+Pr+Nd co-extraction";

a second battery with 4 stages of mixers-decanters dedicated to the "Undesirable elements washing";

a third battery with 5 stages of mixers-decanters dedicated to the "Pr+Nd co-stripping";

a fourth battery with 3 stages of mixers-decanters dedicated to the "Dy washing"; and a fifth battery with 8 stages dedicated to the "Dy stripping".

The aqueous phase A1, which was prepared as described under points 4.1.2 and 4.1.3 hereinbefore, comprises 1.06 g/L of dysprosium, 6.7 g/L of praseodymium, 20.74 g/L of neodymium, 60.25 g/L of iron and 1 mol/L of nitric acid, while the organic phase used for the "Dy+Pr+Nd co-extraction" comprises 0.2 mol/L of TODGA and 5% (v/v) of n-octanol in TPH.

All the steps are carried out at room temperature except for the "Dy stripping" which is carried out at a temperature from 45° C. to 50° C.

After the "Dy stripping", the organic phase is recycled at the head of the method after a control of its concentration of TODGA and an optional adjustment of this concentration.

The test is carried out continuously for 20 hours.

Its proper functioning is followed by analyzing regular samplings in diverse points of the installation.

At the end of the test, the different aqueous and organic phases are collected and analyzed with the purpose of evaluating the performances of the method.

The results of these analyses are reported in FIG. 6. They show that, under the conditions of the test, praseodymium and neodymium are recovered at more than 99.9% with an excellent degree of purity (>99.9%) with regard to the other metal elements present in the magnets (Fe, Co, B, etc.). Dysprosium is then recovered to about 99.5% with also an excellent degree of purity (>99.9%) relatively to said other metal elements.

Example 5: Detailed Scheme of an Example of the First Preferred Embodiment of the Second Method of the Invention A mathematical model of extraction of rare earth metals and of iron from an aqueous solution stemming from the dissolution of a powder of permanent magnets NdFeB in a nitric medium by the first preferred embodiment of the second method of the invention illustrated in FIG. 2, by using an organic phase comprising TODGA as an extractant, and n-octanol as a phase modifier, was developed.

The model takes into account the distribution of the species of interest, here the rare earth metals, between an aqueous phase and an organic phase. In order to optimize the reliability of the model, the latter is based on a chemical description of the phenomena. On the one hand, the activity coefficients in the aqueous phase are taken into account so that the range of validity of the model is as wide as possible in terms of concentration of nitric acid in particular, and, on the other hand, the constants of the model are determined by numerical optimization of the experimental data.

In the present case, the model was developed from experimental data obtained under points 4.1.1, 4.1.2 and 4.1.3 of Example 4 hereinbefore with an organic phase comprising 0.2 mol/L of TODGA and 5% (v/v) of n-octanol in n-dodecane.

It was necessary to model the behavior of nitric acid since the extraction of this acid compete with that of the rare earth metals, and then to propose, from the optimization of the experimental data, complexes of rare earth metals. The complexes of the $\{TR(NO_3)_3, TODGA_n\}$ type, wherein TR designates Dy, Pr or Nd and n varies from 1 to 3, were retained.

With each transferred species between an aqueous phase and an organic phase, a standard mathematical chemical equation was associated.

For nitric acid and the rare earth metals (TR), the mathematical equations are the following:

$$K_n = \frac{[\{HNO_3, TODGA_n\}]}{(\gamma_{HNO_3} \cdot [HNO_3])^m \cdot \overline{[TODGA]}}$$

where n varies from 1 to 3;

$$K'_n = \frac{[\{TR(NO_3)_3, TODGA_n\}]}{\gamma_{TR(NO_3)_3} \cdot [TR(NO_3)_3] \cdot \overline{[TODGA]}^n}$$

where TR=Dy, Pr or Nd and m varies from 1 to 3.

In these equations, $\gamma_{TR(NO_3)_3}$ and $\gamma_{HNO_3}$ designate the activity coefficients of the rare earth metal TR and of nitric acid respectively and the parameters $K_n$ and $K'_n$ are constants.

These constants were optimized in order to reproduce at best the experimental distribution coefficients. The comparison of the experimental data and of the data calculated with the model is shown in table IX hereafter.

TABLE IX

|  | $[H^+]_{eq.}$ (M) | $D_{Fe}$ (exp.) | $D_{Fe}$ (calc.) | $D_{Dy}$ (exp.) | $D_{Dy}$ (calc.) | $D_{Nd}$ (exp.) | $D_{Nd}$ (calc.) | $D_{Pr}$ (exp.) | $D_{Pr}$ (calc.) |
|---|---|---|---|---|---|---|---|---|---|
| Synthetic nitric aqueous phases | 0.109 | 0.0041 | 0.0038 | 119 | 104 | 7.6 | 4.5 | 3.4 | 4.1 |
|  | 0.173 | 0.0032 | 0.0037 | 121 | 92 | 4.9 | 3.5 | 3.1 | 3.1 |
|  | 0.418 | 0.0033 | 0.0033 | 115 | 102 | 4.6 | 3.3 | 2.6 | 2.8 |
|  | 0.761 | 0.0031 | 0.0030 | 114 | 116 | 4.1 | 3.2 | 2.1 | 2.5 |
|  | 1.49 | 0.0024 | 0.0027 | 105 | 132 | 3.6 | 3.2 | 1.4 | 2.0 |
|  | 2.23 | 0.0019 | 0.0029 | 104 | 108 | 3.4 | 3.3 | 1.2 | 1.7 |
| Aqueous phases stemming from the dissolution of a powder of magnets in nitric medium | 0.34 | 0.0014 | 0.0014 | 37 | 43 | 2.3 | 1.8 | 1.9 | 1.6 |
|  | 2.57 | 0.0018 | 0.0030 | 197 | 139 | 13.4 | 3.3 | 6.8 | 2.1 |
|  | 4.76 | 0.0036 | 0.0037 | 34 | 32 | 1.5 | 1.2 | 0.6 | 0.5 |
|  | 5.04 | 0.0037 | 0.0034 | 32 | 32 | 2.4 | 1.2 | 0.9 | 0.5 |

The thereby developed mathematical model gave the possibility of resulting in the detailed scheme which is illustrated in FIGS. 7A and 7B, in which FIG. 7A corresponds to the first cycle dedicated to the selective recovery of dysprosium while FIG. 7B corresponds to the second cycle dedicated to the selective recovery of praseodymium and neodymium. In these figures, the step common to both purification cycles of the organic phase is however not shown.

According to this scheme, an extractor with 7 stages would be necessary, in the first cycle, for extracting more than 99.99% of dysprosium from the aqueous phase A1 ("Dy extraction") while an extractor also with 7 stages would allow separating dysprosium from the other rare earth metals and from the other metal elements ("Pr+Nd+undesirable elements washing") and attaining a purity of dysprosium of the order of 99.99%. An extractor with 5 stages would be necessary for quantitatively stripping dysprosium from the organic phase stemming from the "Pr+Nd+undesirable elements washing" ("Dy stripping") but, considering the results shown in tables IV and VII hereinbefore, this number of stages may be reduced if the extractor is heated to a temperature ranging from 40 to 55° C.

In the second cycle, an extractor with 7 stages would be necessary for co-extracting more than 99.99% of praseodymium and of neodymium present in the aqueous phase stemming from the "Dy extraction" ("Pr+Nd co-extraction") while an extractor with 3 stages would be sufficient for separating the Nd+Pr mixture from the other metal elements ("Undesirable elements washing") and for attaining a purity of the didymium Pr+Nd greater than 99.99%. The stripping of neodymium and of praseodymium from the organic phase having been found to be easier than that of dysprosium, an extractor with 3 stages should be sufficient for quantitatively recovering the didymium Pr+Nd purified in an aqueous phase ("Pr+Nd co-stripping").

The invention is not limited to the embodiments described in the examples hereinbefore. In particular, it is quite possible to adapt the scheme shown in FIGS. 7A and 7B, which was defined for treating an aqueous phase A1 comprising 5 mol/L of nitric acid, to the treatment of aqueous phases comprising another strong acid and/or having quite another acidity and notably, a much weaker acidity such as for example 0.4 mol/L of nitric acid.

CITED REFERENCES

[1] H. Narita and M. Tanaka, *Solvent Extraction Research and Development*, Japan, 2013, 20, 115-121
[2] International application WO 2014/064597

The invention claimed is:

1. A method for selective recovery of at least one rare earth metal TR1 having an atomic number at least equal to 62 from an acid aqueous phase A1, the aqueous phase A1 stemming from a processing of spent or scrapped permanent magnets and comprising one or more rare earth metals TR1, transition metals and an acid having a concentration from 0.2 mol/L to 6 mol/L, the acid being nitric acid, sulphuric acid, hydrochloric acid, phosphoric acid or a mixture thereof, which method comprises:

a) extracting the rare earth metal TR1 from the aqueous phase A1, the extraction comprising putting the aqueous phase A1 in contact with an organic phase S1 not miscible with water, which comprises a diglycolamide having a total number of carbon atoms at least equal to 24 as an extractant, in an organic diluent, and then separating the aqueous phase A1 from the organic phase S1;

b) washing the organic phase S1 stemming from a), the washing comprising putting the organic phase S1 in contact with an acid aqueous phase A2 which comprises an acid identical with the acid of the aqueous phase A1, at a concentration at most equal to the acid concentration of the aqueous phase A1, and then separating the aqueous phase A2 from the organic phase S1; and c) stripping the rare earth metal TR1 from the organic phase S1 stemming from b), the stripping comprising putting the organic phase S1 in contact with an acid aqueous phase A3 which has a pH at least equal to 3, and then separating the aqueous phase A3 from the organic phase S1.

2. The method of claim 1, wherein the diglycolamide has the formula: $R^1(R^2)N$—$C(O)$—$CH_2$—$O$—$CH_2$—$C(O)$—$N(R^3)R^4$ wherein each of $R^1$ to $R^4$ represents a linear or branched alkyl group comprising at least 5 carbon atoms.

3. The method of claim 1, wherein the diglycolamide is N,N,N',N'-tetraoctyl-3-oxapentanediamide, N,N,N',N'-tetra(2-ethylhexyl)-3-oxapentanediamide, N,N,N',N'-tetradecyl-3-oxapentanediamide or N,N,N',N'-tetradodecyl-3-oxapentanediamide.

4. The method of claim 1, wherein the organic phase S1 comprises from 0.05 mol/L to 1 mol/L of the diglycolamide.

5. The method of claim 1, wherein the aqueous phase A2 comprises from 0.01 mol/L to 0.5 mol/L of the acid.

6. The method of claim 1, wherein the aqueous phase A3 comprises from 0.0001 mol/L to 0.001 mol/L of nitric acid, sulphuric acid, hydrochloric acid, phosphoric acid or a mixture thereof.

7. The method of claim 1, wherein the strong acid of the aqueous phases A1 and A2 is nitric acid.

8. The method of claim 1, which comprises a cycle, the cycle comprising a), b), c) and a purification of the organic phase S1 stemming from c).

9. The method of claim 1, wherein the aqueous phase A1 stems from the processing of neodymium-iron-boron permanent magnets in nitric acid, sulphuric acid, hydrochloric acid, phosphoric acid or a mixture thereof and the rare earth metal TR1 is dysprosium.

10. A method for selective recovery of at least one rare earth metal TR1 having an atomic number at least equal to 62 and of at least one rare earth metal TR2 having an atomic number at most equal to 61 from an acid aqueous phase A1, the aqueous phase A1 stemming from a processing of spent or scrapped permanent magnets and comprising one or more rare earth metals TR1, one or more rare earth metals TR2, transition metals and an acid having a concentration from 0.2 mol/L to 6 mol/L, the acid being nitric acid, sulphuric acid, hydrochloric acid, phosphoric acid or a mixture thereof, which method comprises:

recovery of the rare earth metal TR1 from the aqueous phase A1, which recovery comprises:

a) extracting the rare earth metal TR1 from the aqueous phase A1, the extraction comprising putting the aqueous phase A1 in contact with an organic phase S1 not miscible with water, which comprises a diglycolamide having a total number of carbon atoms at least equal to 24 as an extractant, in an organic diluent, and then separating the aqueous phase A1 from the organic phase S1;

b) washing the organic phase S1 stemming from a), the washing comprising putting the organic phase S1 in contact with an acid aqueous phase A2, which comprises an acid identical with the acid of the aqueous phase A1, at a concentration at most equal to the strong acid concentration of the aqueous phase A1, and then separating the aqueous phase A2 from the organic phase S1; and c) stripping the rare earth metal TR1 from the organic phase S1 stemming from b), the stripping comprising putting the organic phase S1 in contact with an acid aqueous phase A3 which has a pH at least equal to 3, and then separating the aqueous phase A3 from the organic phase S1; and recovery of the rare earth metal TR2 from the aqueous phase A1 stemming from a), which recovery comprises:

d) extracting the rare earth metal TR2 from the aqueous phase A1 stemming from a), the extraction comprising putting the aqueous phase A1 in contact with an organic phase S2 not miscible with water, which comprises an extractant identical with the extractant of the organic phase S1, in an organic diluent, and then separating the aqueous phase A1 from the organic phase S2;

e) washing the organic phase S2 stemming from d), the washing comprising putting the organic phase S2 in contact with an acid aqueous phase A4, which comprises an acid identical with the acid of the aqueous phase A1, at a concentration at most equal to the acid concentration of the aqueous phase A1 stemming from a), and then separating the aqueous phase A4 from the organic phase S2; and f) stripping the rare earth metal TR2 from the organic phase S2 stemming from e), the stripping comprising putting the organic phase S2 in contact with an acid aqueous phase A5 which has a pH at least equal to 3, and then separating the aqueous phase A5 from the organic phase S2.

11. The method of claim 10, wherein the diglycolamide has the formula: $R^1(R^2)N\text{—}C(O)\text{—}CH_2\text{—}O\text{—}CH_2\text{—}C(O)\text{—}N(R^3)R^4$ wherein each of $R^1$ to $R^4$ represents a linear or branched alkyl group comprising at least 5 carbon atoms.

12. The method of claim 10, wherein the diglycolamide is N,N,N',N'-tetraoctyl-3-oxapentanediamide, N,N,N',N'-tetra(2-ethylhexyl)-3-oxapentanediamide, N,N,N',N'-tetradecyl-3-oxapentanediamide or N,N,N',N'-tetradodecyl-3-oxapentanediamide.

13. The method of claim 10, wherein the organic phase S1 comprises from 0.05 mol/L to 1 mol/L of the diglycolamide.

14. The method of claim 10, wherein the aqueous phase A2 comprises from 0.01 to 0.5 mol/L of the acid.

15. The method of claim 10, wherein the aqueous phase A4 comprises from 0.2 mol/L to 4 mol/L of the acid.

16. The method of claim 10, wherein each of the aqueous phases A3 and A5 comprises from 0.0001 mol/L to 0.001 mol/L of nitric acid, sulphuric acid, hydrochloric acid, phosphoric acid or a mixture thereof.

17. The method of claim 10, wherein the acid of the aqueous phases A1, A2 and A4 is nitric acid.

18. The method of claim 10, which comprises a first and a second cycle, the first cycle comprising a), b) and c), the second cycle comprising d), e) and f), the first and second cycles further comprising a purification of an organic phase formed by grouping the organic phase S1 stemming from c) and the organic phase S2 stemming from f) and dividing the thereby purified organic phase into the organic phase S1 and the organic phase S2.

19. The method of claim 10, wherein the aqueous phase A1 stems from the processing of neodymium-iron-boron permanent magnets in nitric acid, sulphuric acid, hydrochloric acid, phosphoric acid or a mixture thereof and comprises dysprosium as the rare earth metal TR1 and praseodymium and neodymium as the rare earth metals TR2.

20. A method for selective recovery of at least one rare earth metal TR1 having an atomic number at least equal to 62 and of at least one rare earth metal TR2 having an atomic number at most equal to 61 from an acid aqueous phase A1, the aqueous phase A1 stemming from a processing of spent or scrapped permanent magnets and comprising one or more rare earth metals TR1, one or more rare earth metals TR2, transition metals and an acid having a concentration from 0.2 mol/L to 6 mol/L, the acid being nitric acid, sulphuric acid, hydrochloric acid, phosphoric acid or a mixture thereof, which method comprises:

a) extracting the rare earth metal TR1 and the rare earth metal TR2 from the aqueous phase A1, the extraction comprising putting the aqueous phase A1 in contact with an organic phase S1 not miscible with water, which comprises a diglycolamide having a total number of carbon atoms at least equal to 24 as an extractant, in an organic diluent, and then separating the aqueous phase A1 from the organic phase S1;

b) washing the organic phase S1 stemming from a), the washing comprising putting the organic phase S1 in contact with an acid aqueous phase A2, which comprises an acid identical with the acid of the aqueous phase A1, at a concentration at most equal to the acid concentration of the aqueous phase A1, and then separating the aqueous phase A2 from the organic phase S1;

b') stripping the rare earth metal TR2 from the organic phase S1 stemming from b), the stripping comprising putting the organic phase S1 in contact with an acid aqueous phase A5, which has a pH from 1 to 2.3, and then separating the aqueous phase A5 from the organic phase S1;

b") washing the aqueous phase A5 stemming from b'), the washing comprising putting the aqueous phase A5 in contact with an organic phase S2 not miscible with water, which comprises an extractant identical with the extractant of the organic phase S1, in an organic diluent, and then separating the aqueous phase A5 from the organic phase S2;

c) stripping the rare earth metal TR1 from the organic phase S2 stemming from b'), the stripping comprising putting the organic phase S2 in contact with an acid aqueous phase A3 which has a pH at least equal to 3, and then separating the aqueous phase A3 from the organic phase S2.

21. The method of claim 20, wherein the diglycolamide has the formula: $R^1(R^2)N-C(O)-CH_2-O-CH_2-C(O)-N(R^3)R^4$ wherein each of $R^1$ to $R^4$ represents a linear or branched alkyl group comprising at least 5 carbon atoms.

22. The method of claim 20, wherein the diglycolamide is N,N,N',N'-tetraoctyl-3-oxapentanediamide, N,N,N',N'-tetra(2-ethylhexyl)-3-oxapentanediamide, N,N,N',N'-tetradecyl-3-oxapentanediamide or N,N,N',N'-tetradodecyl-3-oxapentanediamide.

23. The method of claim 20, wherein the organic phase S1 comprises from 0.05 mol/L to 1 mol/L of the diglycolamide.

24. The method of claim 20, wherein the aqueous phase A2 comprises from 0.2 mol/L to 4 mol/L of the acid.

25. The method of claim 20, wherein the aqueous phase A5 comprises from 0.005 mol/L to 0.1 mol/L of nitric acid, sulphuric acid, hydrochloric acid, phosphoric acid or a mixture thereof.

26. The method of claim 20, wherein the aqueous phase A3 comprises from 0.0001 mol/L to 0.001 mol/L of nitric acid, sulphuric acid, hydrochloric acid, phosphoric acid or a mixture thereof.

27. The method of claim 20, wherein the acid of the aqueous phases A1 and A2 is nitric acid.

28. The method of claim 20, which comprises a cycle, the cycle comprising a), b), b'), b"), c), a purification of the organic phase S2 stemming from c) and a division of the thereby purified organic phase into the organic phase S1 and the organic phase S2.

29. The method of claim 20, wherein the aqueous phase A1 stems from the processing of neodymium-iron-boron permanent magnets in nitric acid, sulphuric acid, hydrochloric acid, phosphoric acid or a mixture thereof and comprises dysprosium as the rare earth metal TR1 and praseodymium and neodymium as the rare earth metals TR2.

* * * * *

UNITED STATES PATENT AND TRADEMARK OFFICE
CERTIFICATE OF CORRECTION

PATENT NO. : 10,464,819 B2
APPLICATION NO. : 15/511926
DATED : November 5, 2019
INVENTOR(S) : Manuel Miguirditchian et al.

It is certified that error appears in the above-identified patent and that said Letters Patent is hereby corrected as shown below:

On the Title Page

Item (73), the Assignee is incorrect. Item (73) should read:
-- (73) COMMISSARIAT A L'ENERGIE ATOMIQUE ET AUX ENERGIES ALTERNATIVES, Paris (FR) --

Signed and Sealed this
Twenty-fourth Day of November, 2020

Andrei Iancu
*Director of the United States Patent and Trademark Office*